(12) United States Patent
Lee et al.

(10) Patent No.: US 10,554,969 B2
(45) Date of Patent: Feb. 4, 2020

(54) METHOD AND DEVICE FOR PROCESSING VIDEO SIGNAL

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/758,470

(22) PCT Filed: Sep. 12, 2016

(86) PCT No.: PCT/KR2016/010278
§ 371 (c)(1),
(2) Date: Mar. 8, 2018

(87) PCT Pub. No.: WO2017/043949
PCT Pub. Date: Mar. 16, 2017

(65) Prior Publication Data
US 2018/0255295 A1    Sep. 6, 2018

(30) Foreign Application Priority Data

Sep. 11, 2015  (KR) .................. 10-2015-0128964
Sep. 14, 2015  (KR) .................. 10-2015-0129439

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/176* (2014.11); *H04N 19/59* (2014.11); *H04N 19/593* (2014.11)

(58) Field of Classification Search
CPC .. H04N 19/105; H04N 19/157; H04N 19/117; H04N 19/593; H04N 19/176; H04N 19/59
See application file for complete search history.

(56) References Cited

U.S. PATENT DOCUMENTS

2010/0086034 A1   4/2010  Park et al.
2010/0086035 A1   4/2010  Park et al.
(Continued)

FOREIGN PATENT DOCUMENTS

EP          2773118 A1       9/2014
KR    10-2010-0122450 A     11/2010
(Continued)

OTHER PUBLICATIONS

Akira Minezawa et al., SCCE5 3.1.2: Extended inter-component prediction (JCTVC-Q0036), Document: JCTVC-R0072, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, pp. 1-20.

(Continued)

*Primary Examiner* — Joseph Suh
(74) *Attorney, Agent, or Firm* — IP Legal Services, LLC

(57) ABSTRACT

Provided is a method for decoding a video signal. The method includes generating a first prediction sample by performing intra prediction on a current block, determining an intra prediction pattern of a current block, partitioning the current block into a plurality of sub-blocks based on the determined intra prediction pattern, generating a first prediction sample for a sub-block by performing intra prediction, determining an offset for the sub-block to obtain a second prediction sample, and generating the second prediction sample for the sub-block by using the first prediction sample and the offset.

15 Claims, 23 Drawing Sheets

(51) Int. Cl.
*H04N 19/59* (2014.01)
*H04N 19/593* (2014.01)

(56) References Cited

U.S. PATENT DOCUMENTS

| | | |
|---|---|---|
| 2010/0290527 A1 | 11/2010 | Park et al. |
| 2011/0007800 A1 | 1/2011 | Zheng et al. |
| 2011/0274158 A1 | 11/2011 | Fu et al. |
| 2011/0305274 A1 | 12/2011 | Fu et al. |
| 2011/0305277 A1 | 12/2011 | Fu et al. |
| 2012/0082241 A1 | 4/2012 | Tsai et al. |
| 2012/0082244 A1 | 4/2012 | Chen et al. |
| 2012/0177103 A1 | 7/2012 | Fu et al. |
| 2012/0177107 A1 | 7/2012 | Fu et al. |
| 2012/0294353 A1 | 11/2012 | Fu et al. |
| 2012/0294357 A1 | 11/2012 | Lainema et al. |
| 2013/0114696 A1 | 5/2013 | Liu |
| 2013/0182758 A1 | 7/2013 | Seregin et al. |
| 2013/0182772 A1 | 7/2013 | Seregin et al. |
| 2013/0182773 A1 | 7/2013 | Seregin et al. |
| 2013/0215959 A1 | 8/2013 | Chen et al. |
| 2013/0259117 A1 | 10/2013 | Fu et al. |
| 2014/0037008 A1 | 2/2014 | Park et al. |
| 2014/0112392 A1 | 4/2014 | Lim et al. |
| 2014/0140416 A1 | 5/2014 | Yamazaki et al. |
| 2014/0219334 A1 | 8/2014 | Park |
| 2014/0219336 A1 | 8/2014 | Jeon et al. |
| 2014/0226720 A1 | 8/2014 | Park |
| 2014/0307801 A1* | 10/2014 | Ikai ............... H04N 19/91 375/240.18 |
| 2015/0098508 A1* | 4/2015 | Yie ............... H04N 19/597 375/240.16 |
| 2015/0124866 A1 | 5/2015 | Fu et al. |
| 2015/0124869 A1 | 5/2015 | Fu et al. |
| 2015/0127846 A1* | 5/2015 | Kasai ............ H04N 19/105 709/231 |
| 2015/0172717 A1* | 6/2015 | Zhao ............. H04N 19/597 375/240.16 |
| 2015/0222891 A1 | 8/2015 | Park |
| 2015/0222892 A1 | 8/2015 | Park |
| 2015/0222897 A1 | 8/2015 | Park |
| 2015/0222929 A1 | 8/2015 | Park |
| 2015/0229932 A1* | 8/2015 | Sato ............. H04N 19/159 375/240.12 |
| 2015/0229959 A1 | 8/2015 | Park et al. |
| 2015/0229967 A1* | 8/2015 | Lee ............... H04N 19/30 375/240.02 |
| 2015/0304667 A1 | 10/2015 | Suehring et al. |
| 2015/0334419 A1 | 11/2015 | Park et al. |
| 2015/0350648 A1 | 12/2015 | Fu et al. |
| 2015/0365666 A1* | 12/2015 | Dong ............ H04N 19/117 375/240.12 |
| 2016/0021379 A1 | 1/2016 | Minezawa et al. |
| 2016/0057441 A1 | 2/2016 | Skupin et al. |
| 2016/0134877 A1* | 5/2016 | Chong .......... H04N 19/105 375/240.02 |
| 2016/0156938 A1 | 6/2016 | Fu et al. |
| 2016/0353103 A1 | 12/2016 | Park |
| 2016/0360211 A1 | 12/2016 | Fu et al. |
| 2017/0034511 A1 | 2/2017 | Yamazaki et al. |
| 2017/0163982 A1 | 6/2017 | Fu et al. |
| 2017/0208343 A1 | 7/2017 | Jeon et al. |
| 2017/0324972 A1 | 11/2017 | Park et al. |
| 2018/0035121 A1 | 2/2018 | Park et al. |
| 2018/0152701 A1 | 5/2018 | Park |
| 2018/0295383 A1 | 10/2018 | Jeon et al. |

FOREIGN PATENT DOCUMENTS

| | | |
|---|---|---|
| KR | 10-2013-0102603 A | 9/2013 |
| KR | 10-2015-0003286 A | 1/2015 |
| KR | 10-2015-0103224 A | 9/2015 |
| WO | 2012/092777 A1 | 7/2012 |
| WO | 2013/154008 A1 | 10/2013 |
| WO | 2014/106651 A1 | 7/2014 |

OTHER PUBLICATIONS

European Patent Office, Extended European Search Report of corresponding EP Patent Application No. 16844765.4, dated Feb. 15, 2019.

\* cited by examiner

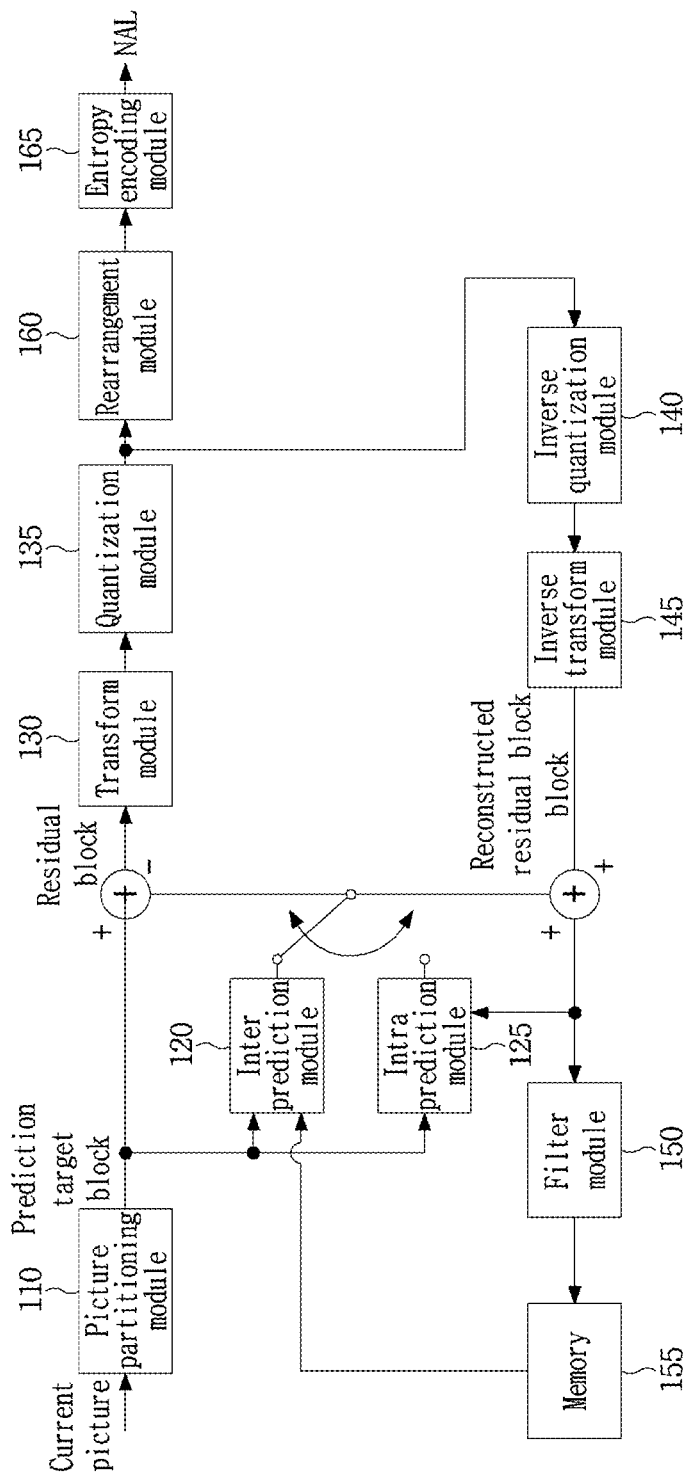
[FIG 1]

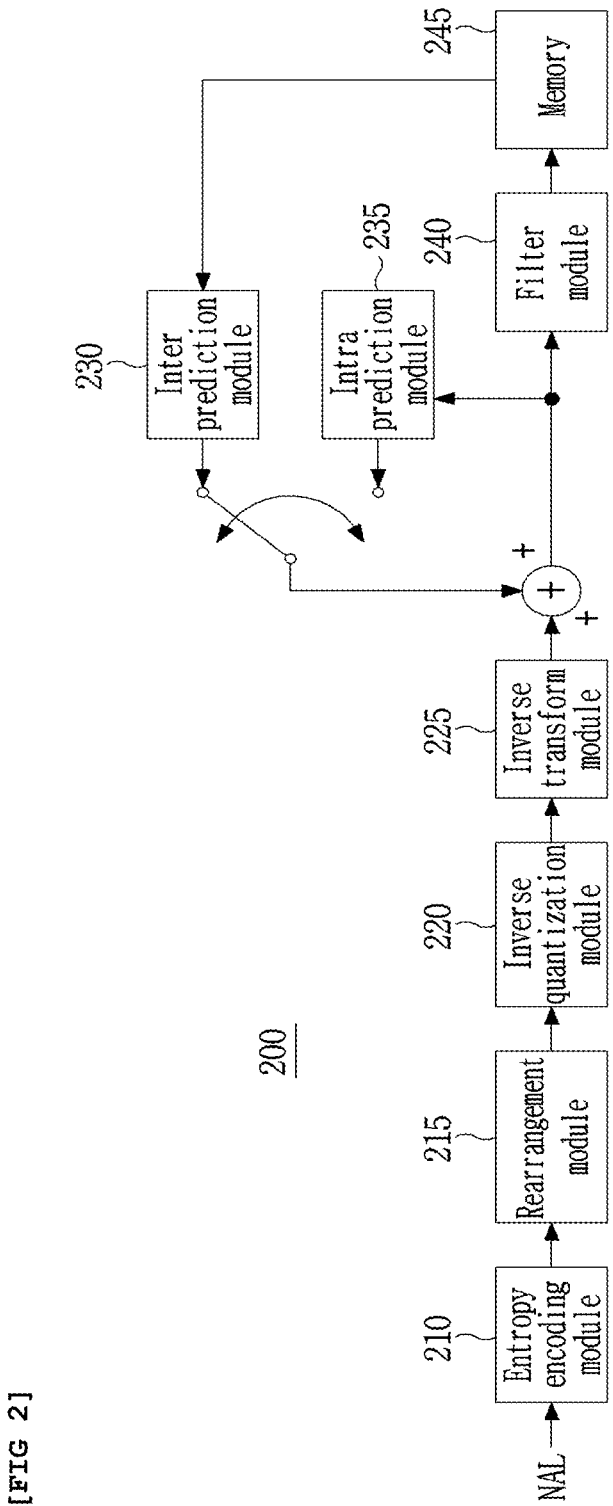
[FIG 2]

[FIG 3]
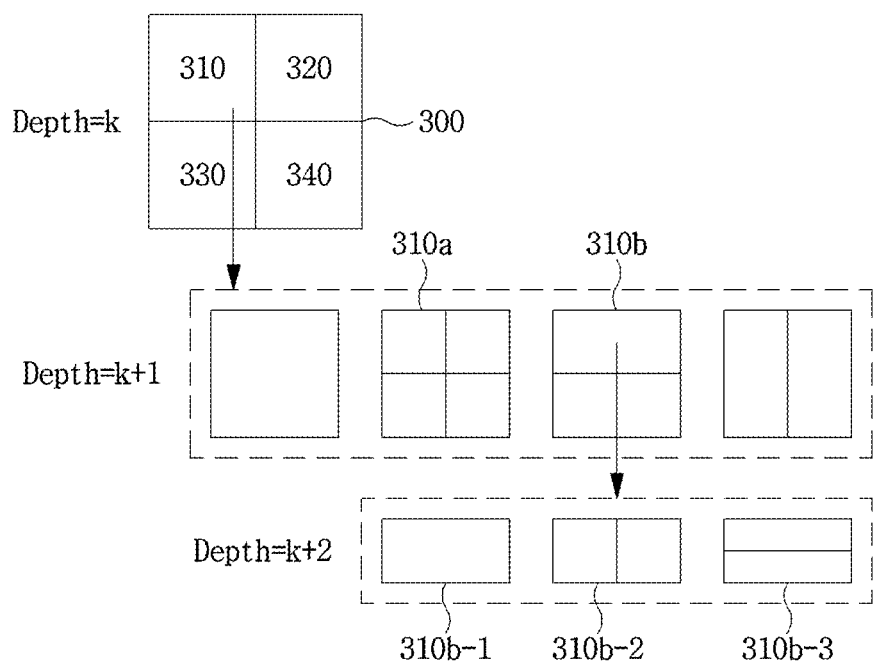

[FIG 4]
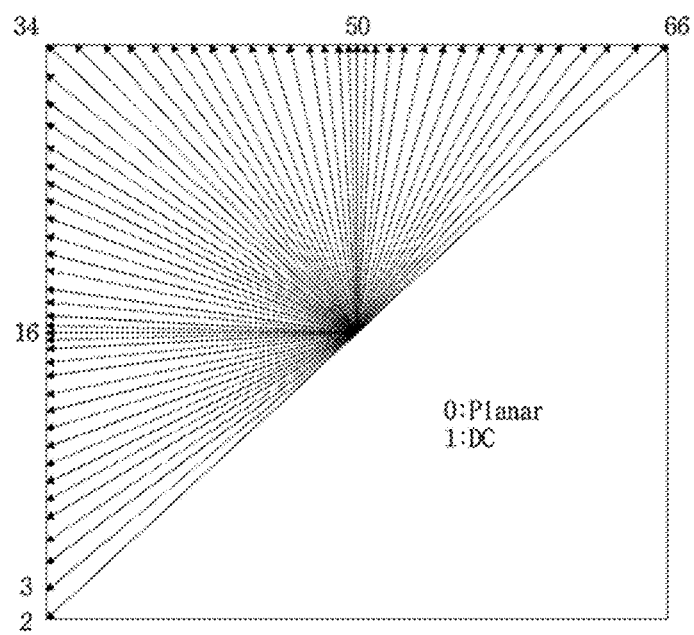
[FIG 5]
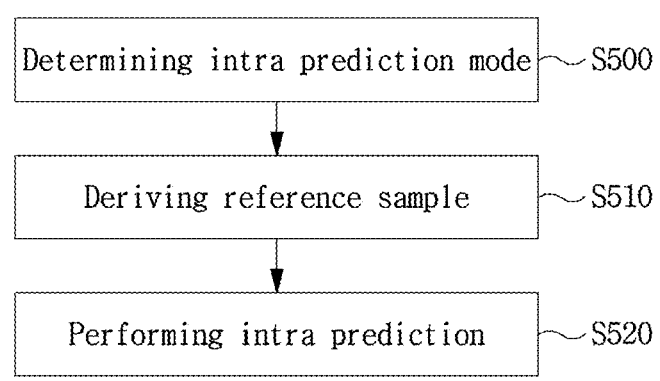

[FIG 6]
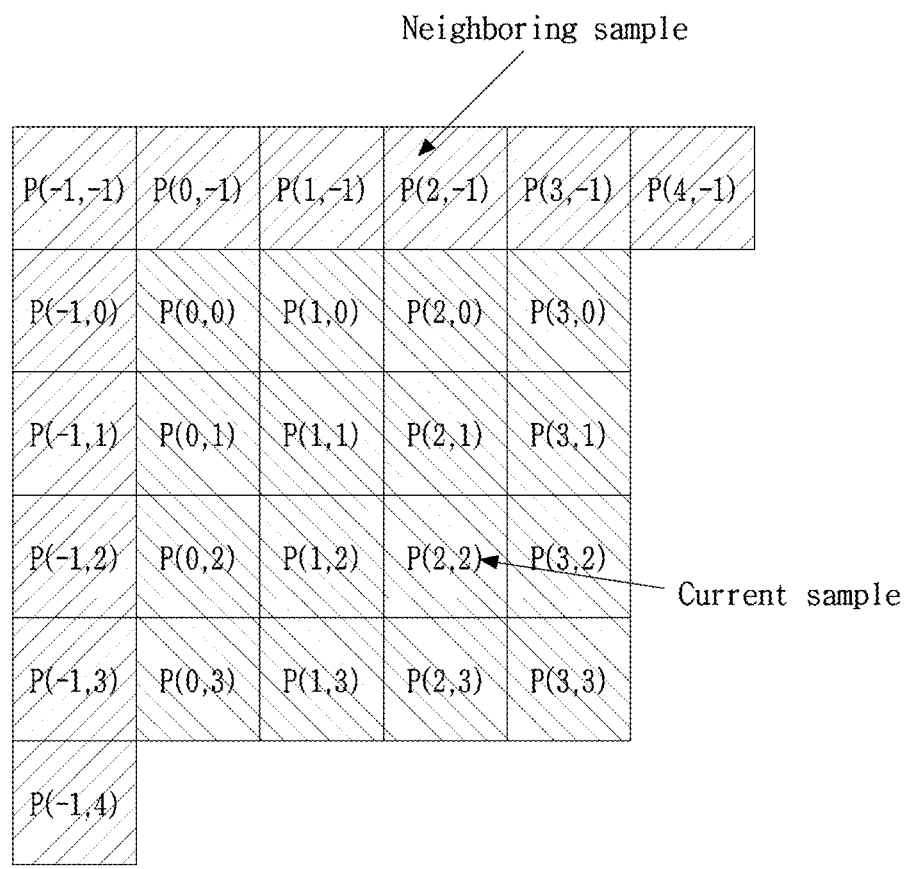

[FIG 7]
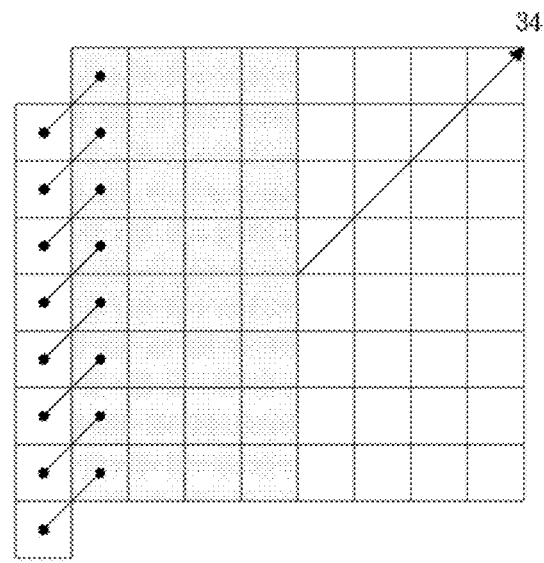
[FIG 8]
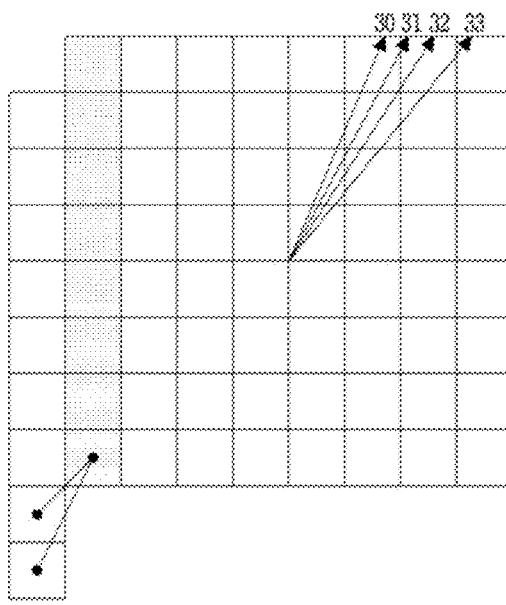

[FIG 9]
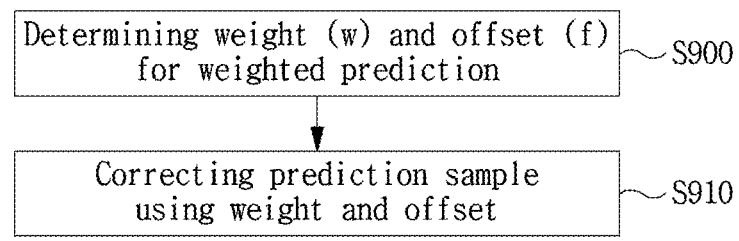

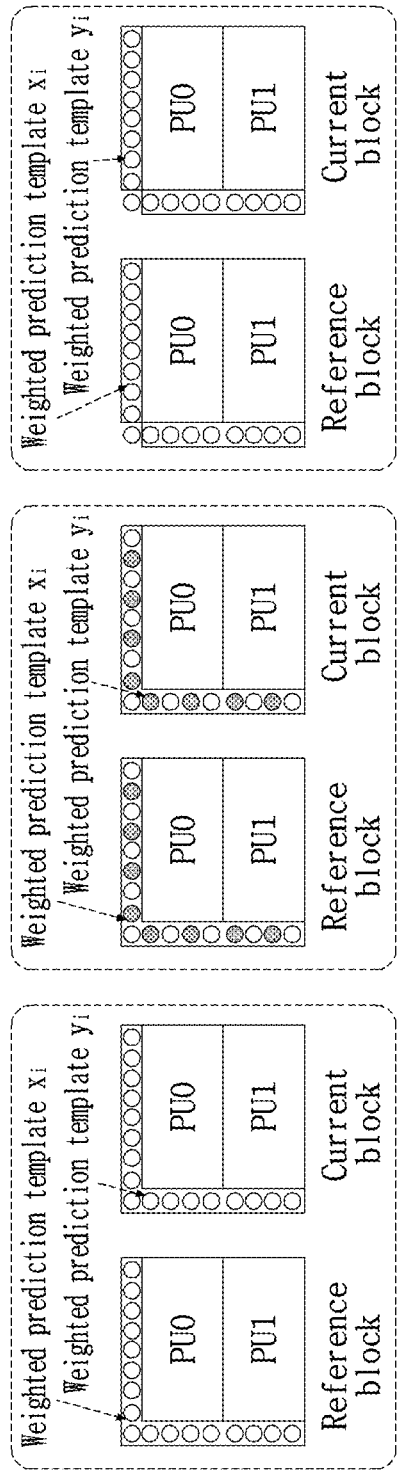

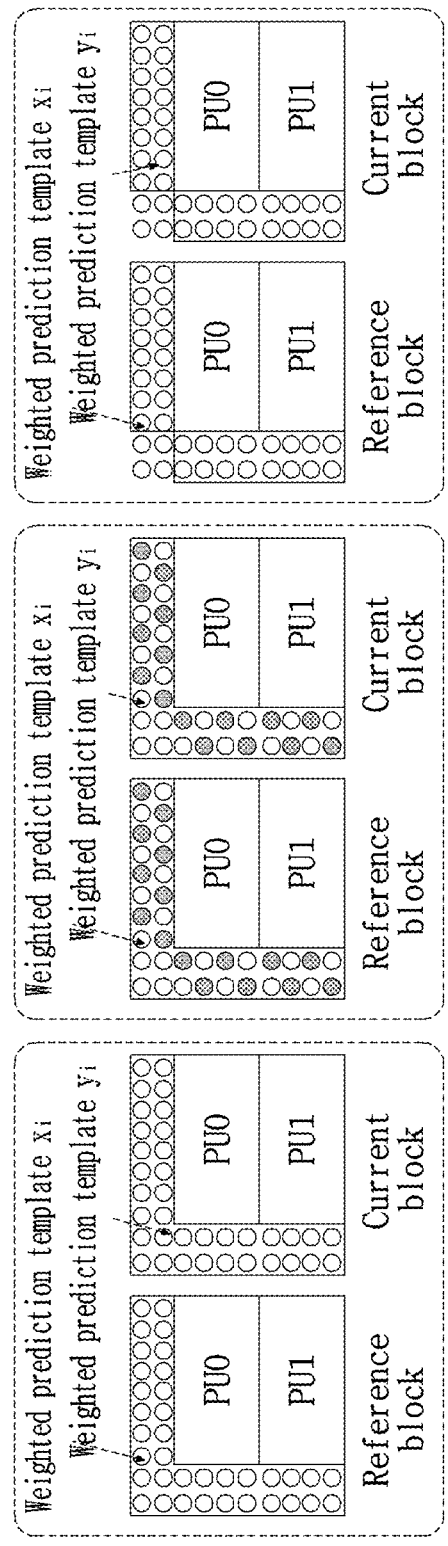
[FIG 11]

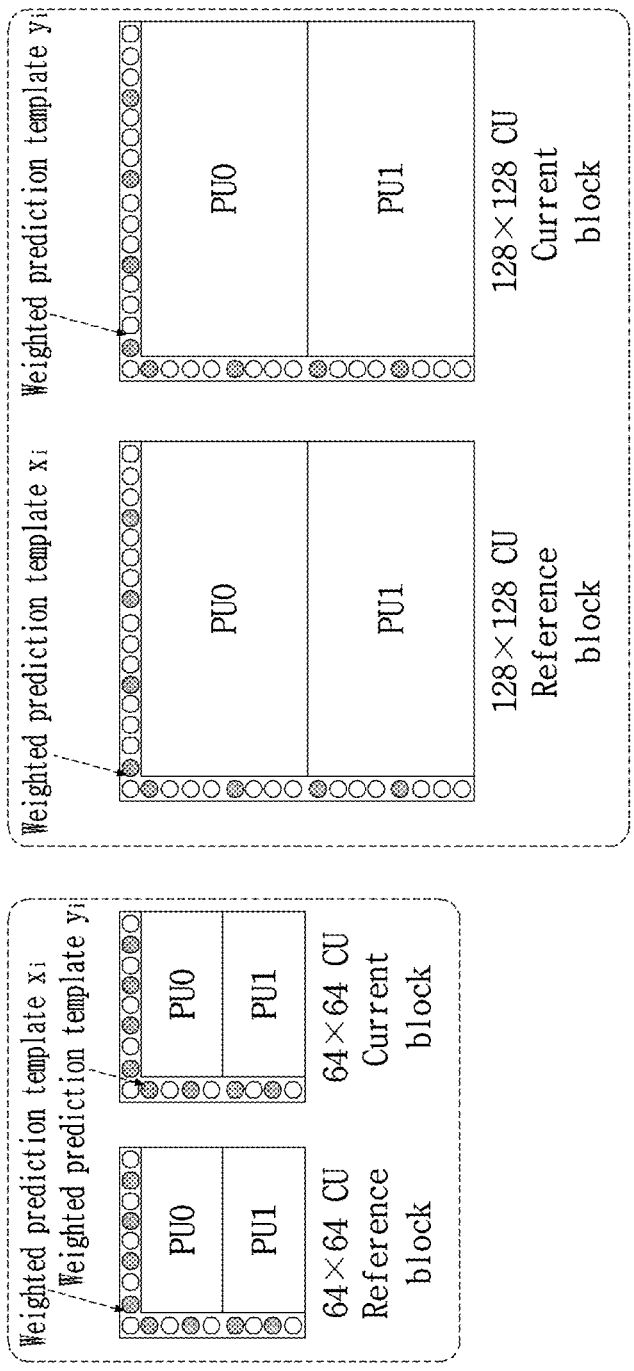

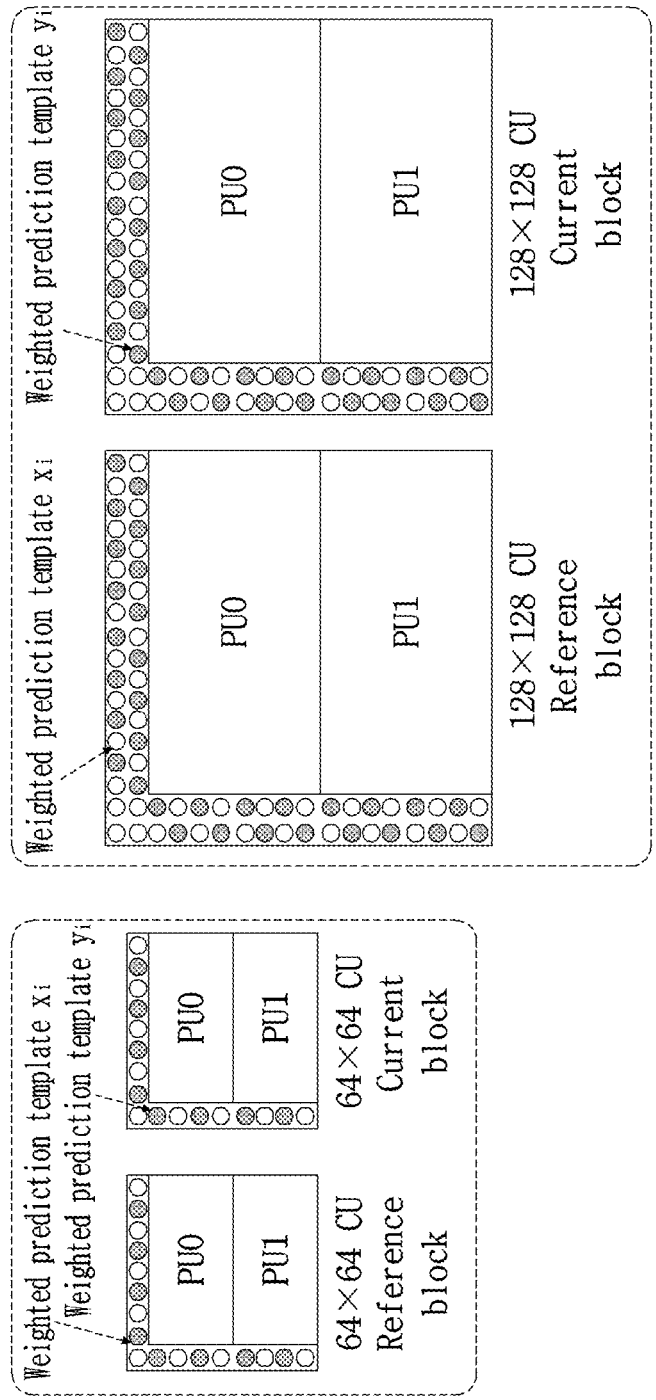
[FIG 13]

[FIG 14]
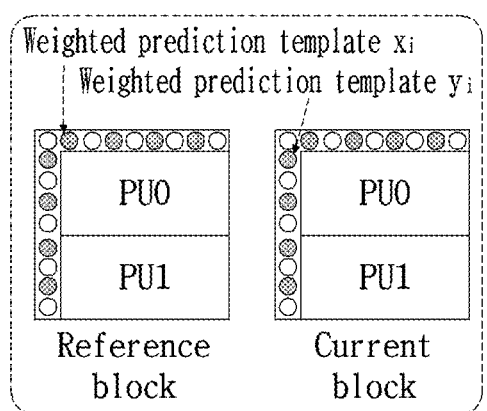
type_weight_pred_template_idx = 0
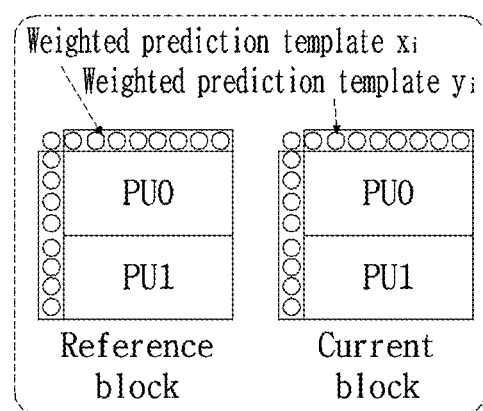
type_weight_pred_template_idx = 1
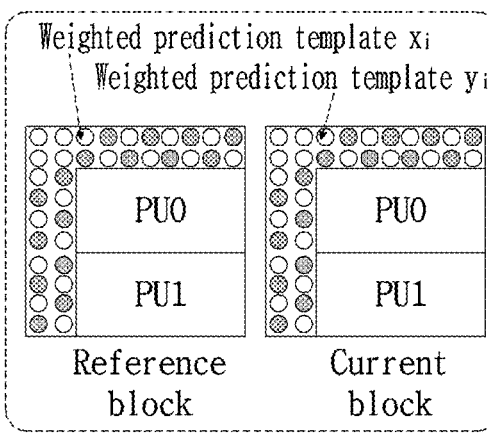
type_weight_pred_template_idx = 2
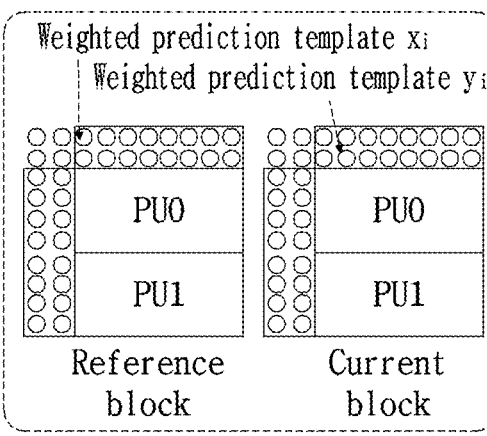
type_weight_pred_template_idx = 3

[FIG 15]
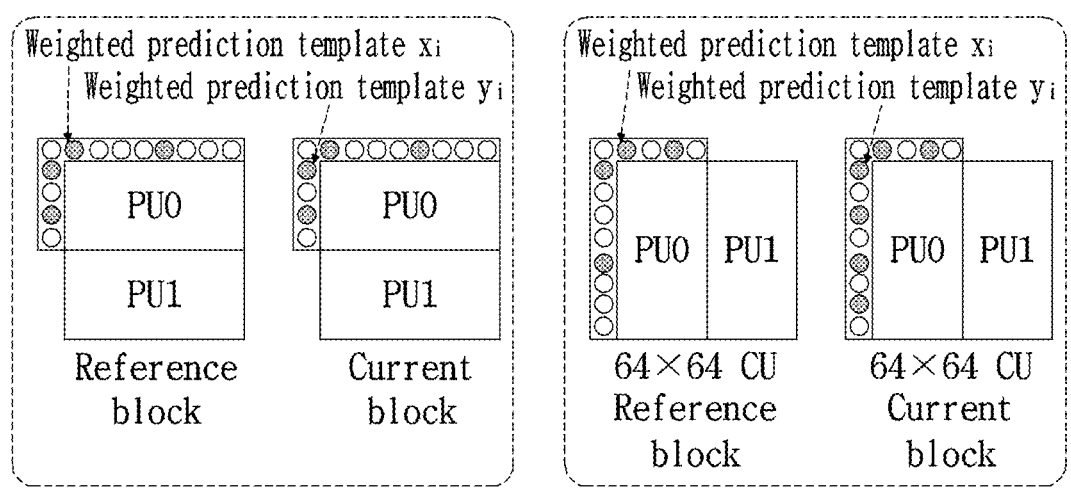

[FIG 16]
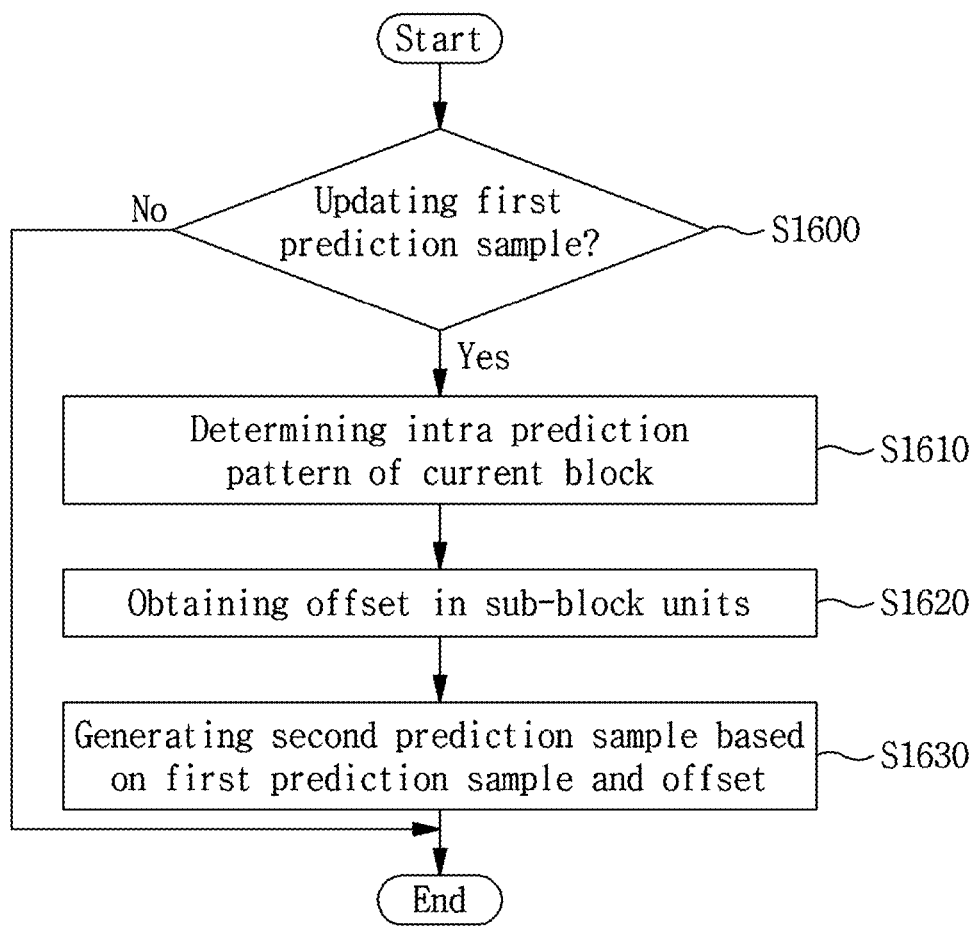

[FIG 17]

| P(i,j)    | P(i,j)    | P(i,j) | P(i,j)+f | P(i,j) | P(i,j)-f |
|-----------|-----------|--------|----------|--------|----------|
| P(i,j)+f  | P(i,j)-f  |        |          |        |          | index 0     index 1     index 2     index 3

[FIG 18]

| P(i,j)+h | P(i,j)-h | P(i,j)+h | P(i,j)+f | P(i,j)-h | P(i,j)-f |
|----------|----------|----------|----------|----------|----------|
| P(i,j)+f | P(i,j)-f |          |          |          |          | index 0     index 1     index 2     index 3

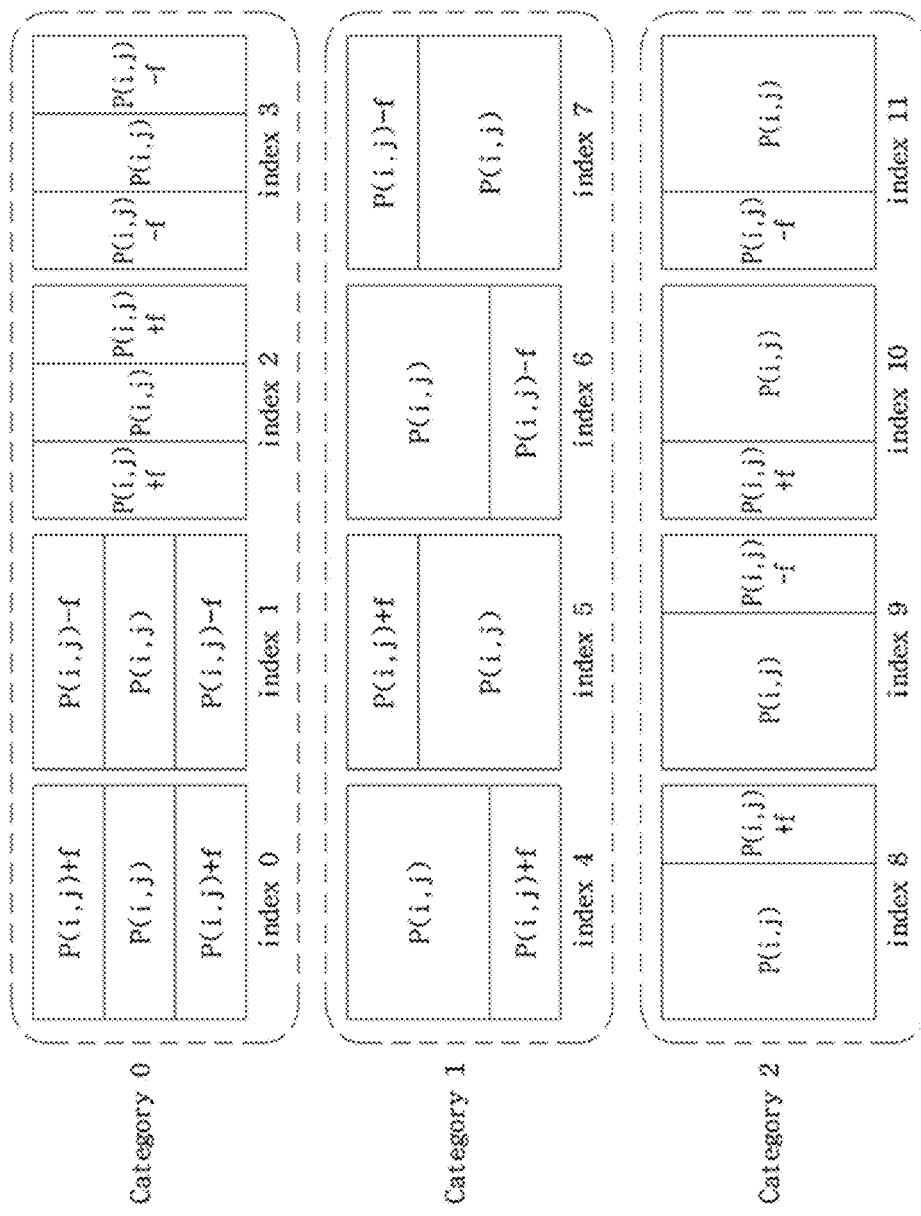
[FIG 19]

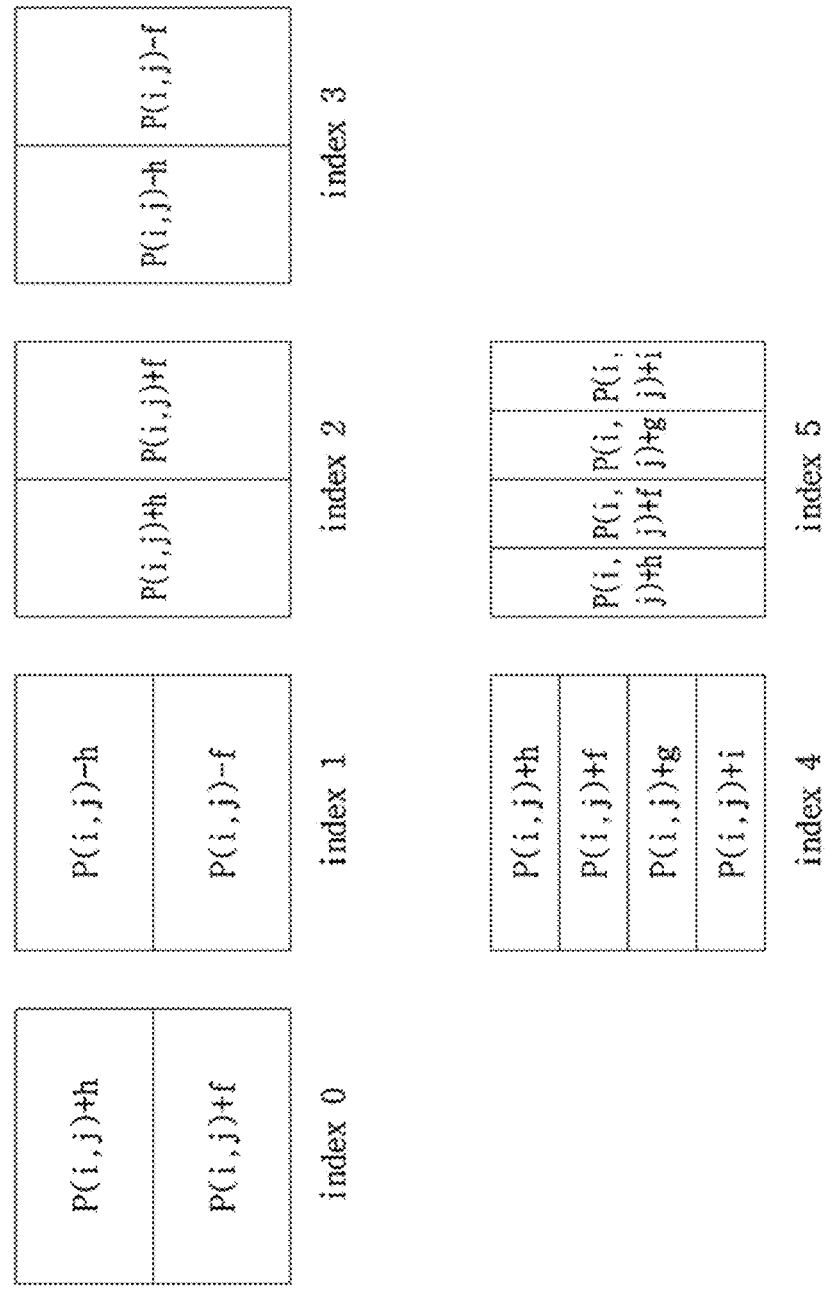

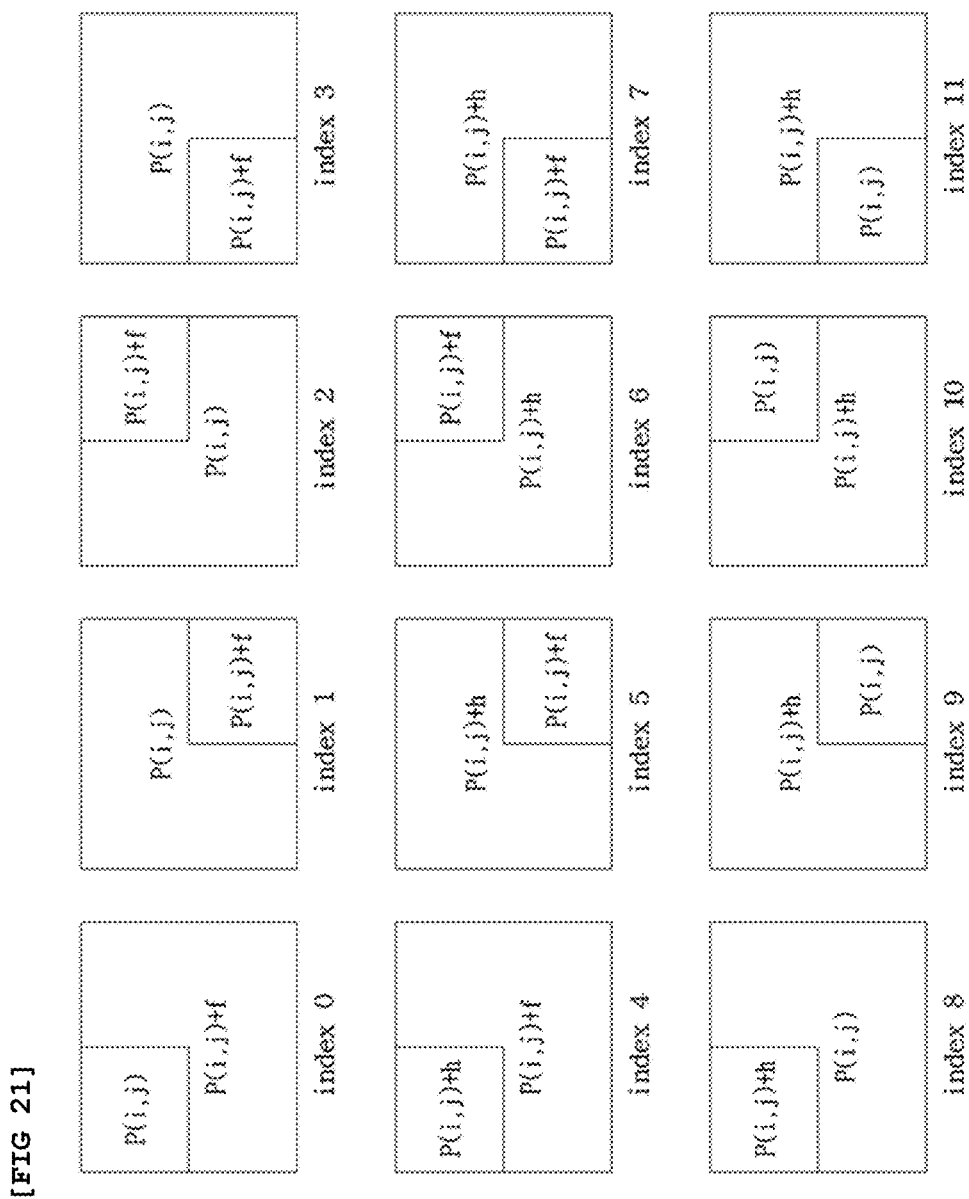
[FIG 21]

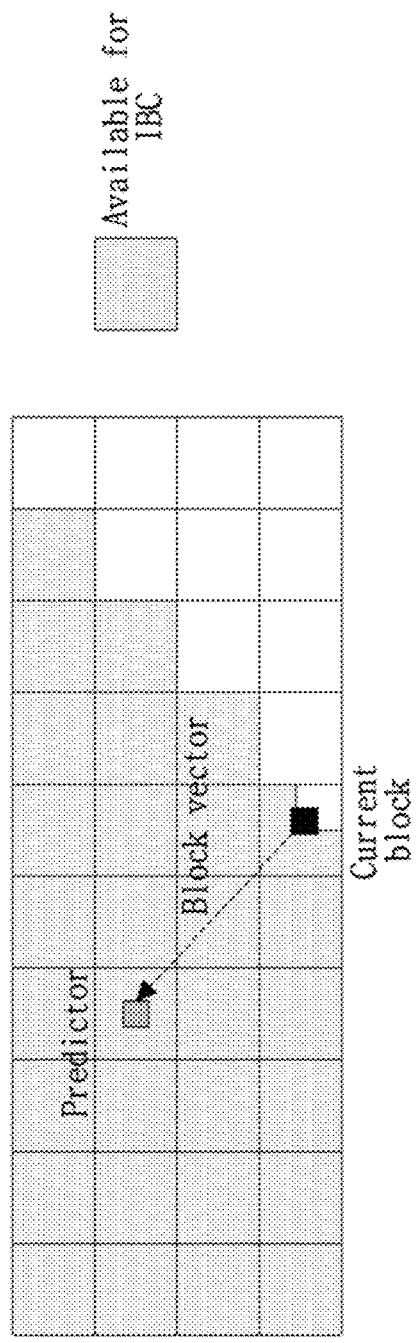
[FIG 22]

[FIG 23]
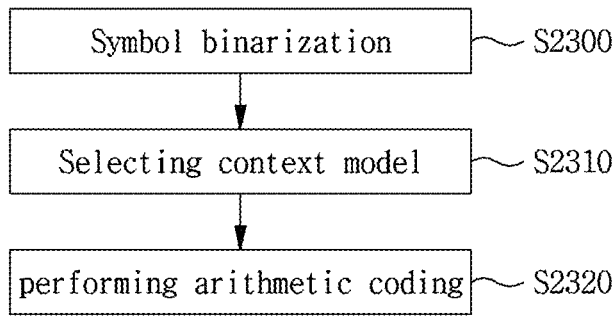
[FIG 24]
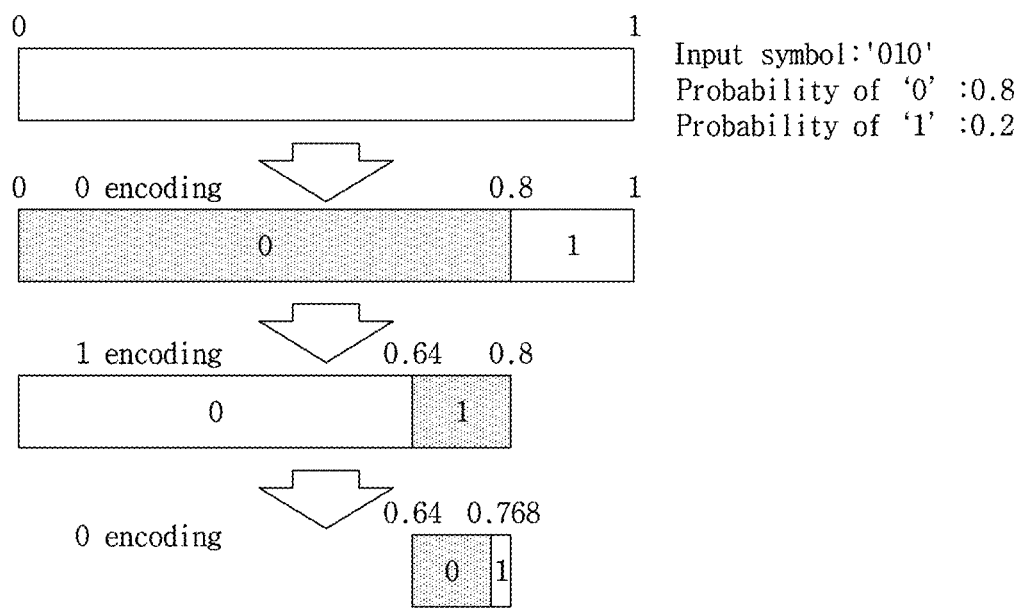

[FIG 25]
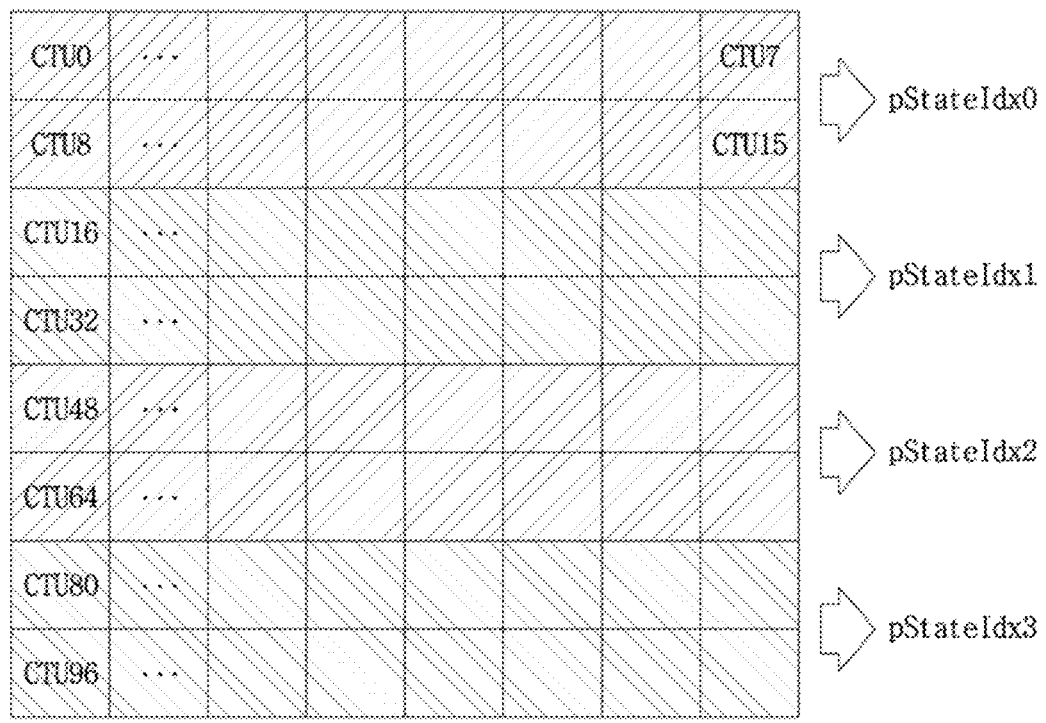

[FIG 26]
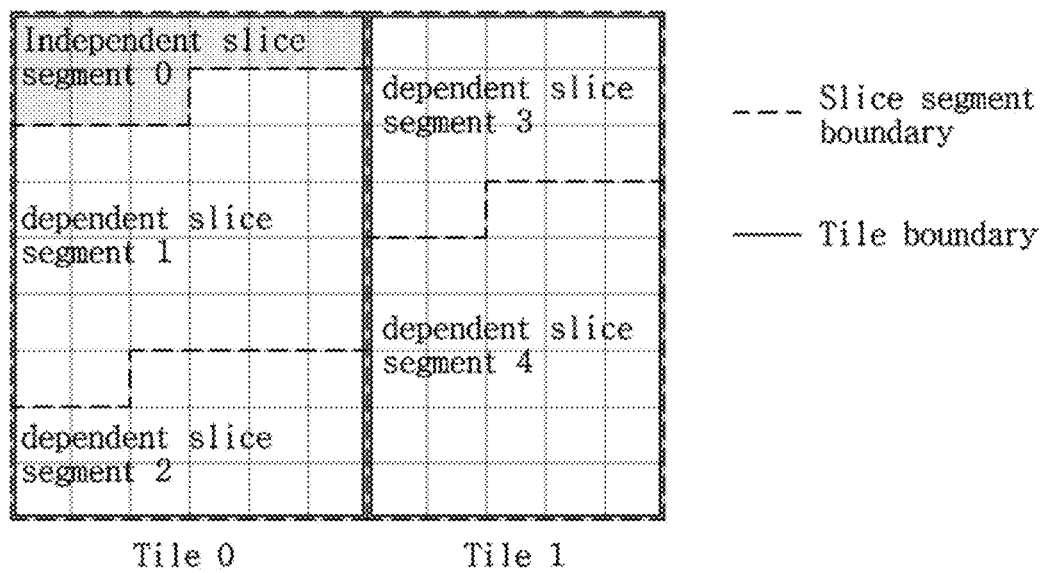
[FIG 27]
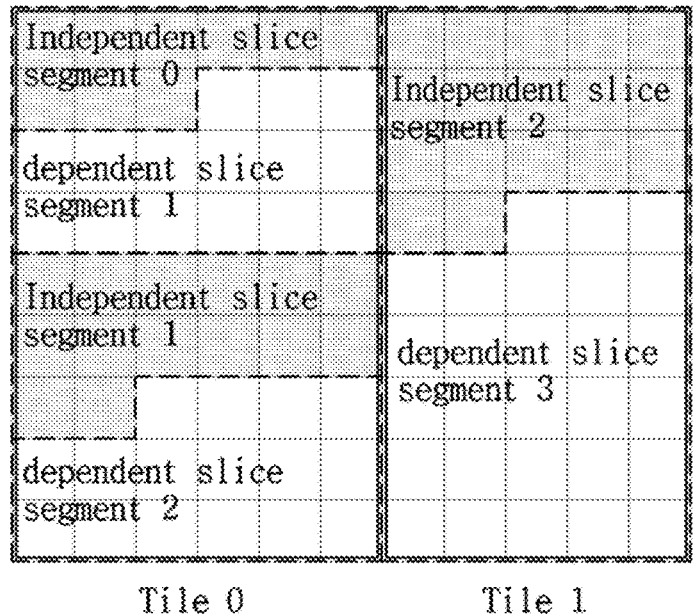

[FIG 28]
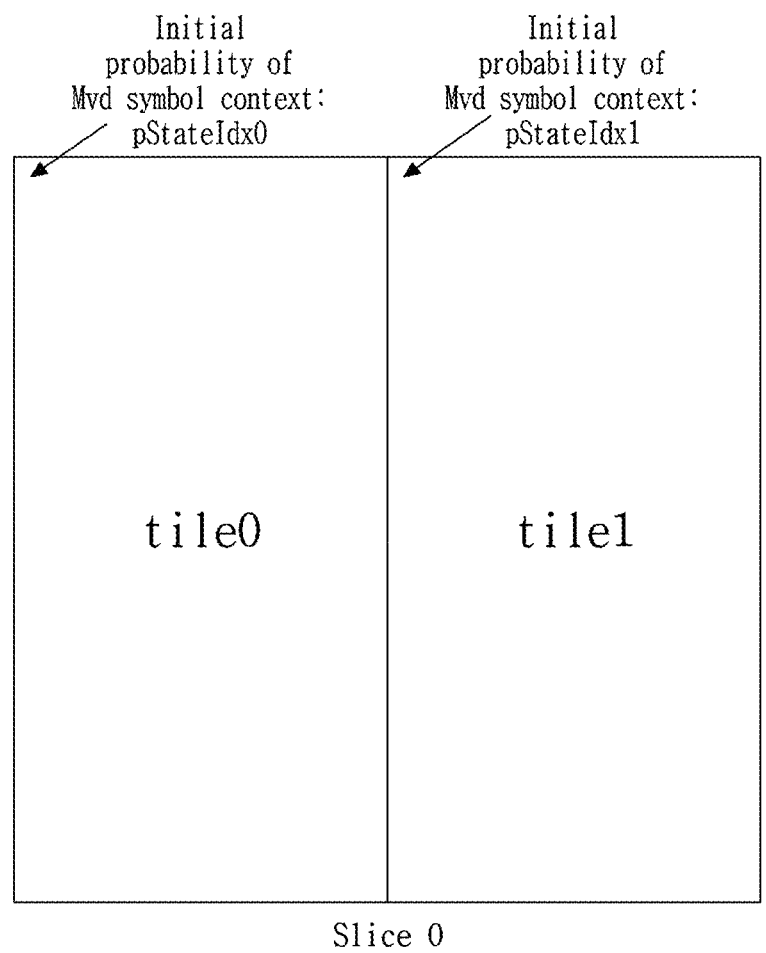

METHOD AND DEVICE FOR PROCESSING VIDEO SIGNAL

CROSS REFERENCE TO RELATED APPLICATIONS

This application is a National Stage Patent Application of PCT International Patent Application No. PCT/KR2016/010278 (filed on Sep. 12, 2016) under 35 U.S.C. § 371, which claims priority to Korean Patent Application Nos. 10-2015-0128964 (filed on Sep. 11, 2015) and 10-2015-0129439 (filed on Sep. 14, 2015), the teachings of which are incorporated herein in their entireties by reference.

TECHNICAL FIELD

The present invention relates to a method and device for processing a video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is intended to provide a method and device for encoding/decoding a video signal, the method and device hierarchically partitioning a coding block.

An object of the present invention is intended to provide a method and device for encoding/decoding a video signal, the method and device performing intra prediction of an encoding/decoding target block.

An object of the present invention is intended to provide a method and device for encoding/decoding a video signal, the method and device correcting a prediction sample of an encoding/decoding target block.

An object of the present invention is intended to provide a method and device for encoding/decoding a video signal, the method and device updating the first prediction sample generated through intra prediction to the second prediction sample by using offset.

Technical Solution

According to the present invention, there is provided a method and device for decoding a video signal, the method including: generating a first prediction sample by performing intra prediction on a current block; determining an intra prediction pattern specifying a pattern in which the current block is partitioned into sub-blocks; determining offset in sub-block units of the current block based on the intra prediction pattern; and generating a second prediction sample in sub-block units of the current block by using the first prediction sample and the offset.

In the method and device for decoding a video signal according to the present invention, the current block may include multiple sub-blocks, and whether or not the offset is set for each sub-block may be determined.

In the method and device for decoding a video signal according to the present invention, whether or not the offset is set for a sub-block may be determined based on a position of the sub-block.

In the method and device for decoding a video signal according to the present invention, the current block may include multiple sub-blocks, and the offset may be set to a different value for each sub-block.

In the method and device for decoding a video signal according to the present invention, the offset may be derived from a reference sample adjacent to the current block.

According to the present invention, there is provided a method and device for encoding a video signal, the method including: generating a first prediction sample by performing intra prediction on a current block; determining an intra prediction pattern specifying a pattern in which the current block is partitioned into sub-blocks; determining offset in sub-block units of the current block based on the intra prediction pattern; and generating a second prediction sample in sub-block units of the current block by using the first prediction sample and the offset.

In the method and device for encoding a video signal according to the present invention, the current block may include multiple sub-blocks, and whether or not the offset is set for each sub-block may be determined.

In the method and device for encoding a video signal according to the present invention, whether or not the offset is set for a sub-block may be determined based on a position of the sub-block.

In the method and device for encoding a video signal according to the present invention, the current block may include multiple sub-blocks, and the offset may be set to a different value for each sub-block.

In the method and device for encoding a video signal according to the present invention, the offset may be derived from a reference sample adjacent to the current block.

Advantageous Effects

According to the present invention, it is possible to enhance encoding efficiency through hierarchical/adaptive partitioning of a coding block.

According to the present invention, it is possible to effectively determine an intra prediction mode of an encoding/decoding target block, and to enhance accuracy of intra prediction.

DESCRIPTION OF DRAWINGS

FIG. 1 is a block diagram illustrating a device for encoding a video according to an embodiment of the present invention.

FIG. 2 is a block diagram illustrating a device for decoding a video according to an embodiment of the present invention.

FIG. 3 is a view illustrating an example of hierarchically partitioning a coding block based on a tree structure according to an embodiment of the present invention.

FIG. 4 is a view illustrating types of pre-defined intra prediction modes for a device for encoding/decoding a video according to an embodiment of the present invention.

FIG. 5 is a flowchart briefly illustrating an intra prediction method according to an embodiment of the present invention.

FIG. 6 is a view illustrating a method of correcting a prediction sample of a current block based on differential information of neighboring samples according to an embodiment of the present invention.

FIGS. 7 and 8 are views illustrating a method of correcting a prediction sample based on a predetermined correction filter according to an embodiment of the present invention.

FIG. 9 is a view illustrating a method of correcting a prediction sample using weight and offset according to an embodiment of the present invention.

FIGS. 10 to 15 are views illustrating a method of composing a template to determine weight w according to an embodiment of the present invention.

FIG. 16 is a view illustrating a method of correcting a prediction sample based on offset according to an embodiment of the present invention.

FIGS. 17 to 21 are views illustrating examples of an intra prediction pattern of a current block according to an embodiment of the present invention.

FIG. 22 is a view illustrating a method of performing prediction using an intra block copy technique according to an embodiment of the present invention.

FIG. 23 is a flowchart illustrating a process of encoding a symbol.

FIG. 24 is a view illustrating an example of dividing an interval between [0,1) into sub-intervals based on an occurrence probability of a symbol.

FIG. 25 is a view illustrating an example of setting a probability index depending on a position of a block to be encoded.

FIGS. 26 and 27 are views illustrating examples of partitioning of tiles and slice segments.

FIG. 28 is a view illustrating an example of determining an initial probability index for each tile differently.

BEST MODE

According to the present invention, there is provided a method and device for decoding a video signal, the method including: generating a first prediction sample by performing intra prediction on a current block; determining an intra prediction pattern specifying a pattern in which the current block is partitioned into sub-blocks; determining offset in sub-block units of the current block based on the intra prediction pattern; and generating a second prediction sample in sub-block units of the current block by using the first prediction sample and the offset.

In the method and device for decoding a video signal according to the present invention, the current block may include multiple sub-blocks, and whether or not the offset is set for each sub-block may be determined.

In the method and device for decoding a video signal according to the present invention, whether or not the offset is set for a sub-block may be determined based on a position of the sub-block.

In the method and device for decoding a video signal according to the present invention, the current block may include multiple sub-blocks, and the offset may be set to a different value for each sub-block.

In the method and device for decoding a video signal according to the present invention, the offset may be derived from a reference sample adjacent to the current block.

According to the present invention, there is provided a method and device for encoding a video signal, the method including: generating a first prediction sample by performing intra prediction on a current block; determining an intro prediction pattern specifying a pattern in which the current block is partitioned into sub-blocks; determining offset in sub-block units of the current block based on the intra prediction pattern; and generating a second prediction sample in sub-block units of the current block by using the first prediction sample and the offset.

In the method and device for encoding a video signal according to the present invention, the current block may include multiple sub-blocks, and whether or not the offset is set for each sub-block may be determined.

In the method and device for encoding a video signal according to the present invention, whether or not the offset is set for a sub-block may be determined based on a position of the sub-block.

In the method and device for encoding a video signal according to the present invention, the current block may include multiple sub-blocks, and the offset may be set to a different value for each sub-block.

In the method and device for encoding a video signal according to the present invention, the offset may be derived from a reference sample adjacent to the current block.

MODE FOR INVENTION

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in derail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 119 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be partitioned in at least one square shape or rectangular shape having the same size in a single coding unit, or may be partitioned such that one partitioned prediction unit in a single coding unit has a shape and/or a size different from another partitioned prediction unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by intactly encoding the original block without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less than the integer pixel from the reference picture. In the case of luma pixels, an 8-tap OCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with of reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction units generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may perform rearrangement receiving information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on the transform unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblock filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing an encoding unit, but the coding unit may serve as a unit performing decoding as well as encoding.

FIG. 3 is a view illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Binary tree-based partitioning may be symmetrically or asymmetrically performed. The coding block partitioned based on the binary tree may be a square block or a non-square block, such as a rectangular shape. Binary tree-based partitioning may be performed on a coding block where quad tree-based partitioning is no longer performed. Quad tree-based partitioning may no longer be performed on the coding block partitioned based on the binary tree.

In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

FIG. 4 is a view illustrating types of pre-defined intra prediction modes for a device for encoding/decoding a video according to an embodiment of the present invention.

The device for encoding/decoding a video may perform intra prediction using one of pre-defined intra prediction modes. The pre-defined intra prediction modes for intra prediction may include non-directional prediction modes (e.g., a planar mode, a DC mode) and 33 directional prediction modes.

Alternatively, in order to enhance accuracy of intra prediction, a larger number of directional prediction modes than the 33 directional prediction mode may be used. That is, M extended directional prediction modes may be defined by subdividing angles of the directional prediction modes (M>33), and a directional prediction mode having a predetermined angle may be derived using at least one of the 33 pre-defined directional prediction modes.

FIG. 4 shows an example of extended intra prediction modes, and the extended intra prediction modes may include two non-directional prediction modes and 65 extended directional prediction modes. The same numbers of the extended intra prediction modes may be used for a luma component and a chroma component, or a different number of intra prediction modes may be used for each component. For example, 67 extended intra prediction modes may be used for the luma component, and 35 intra prediction modes may be used for the chroma component.

Alternatively, depending on the chroma format, a different number of intra prediction modes may be used in performing intra prediction. For example, in the case of the 4:2:0 format, 67 intra prediction modes may be used for the luma component to perform intra prediction and 35 intra prediction modes may be used for the chroma component. In the case of the 4:4:4 format, 67 intra prediction modes may be used for both the luma component and the chroma component to perform intra prediction.

Alternatively, depending on the size and/or shape of the block, a different number of intra prediction modes may be used to perform intra prediction. That is, depending on the size and/or shape of the PU or CU, 35 intra prediction modes or 67 intra prediction modes may be used to perform intra prediction. For example, when the CU or PU has the size less than 64×64 or is asymmetrically partitioned, 35 intra prediction modes may be used to perform intra prediction. When the size of the CU or PU is equal to or greater than 64×64, 67 intra prediction modes may be used to perform intra prediction. 65 directional intra prediction modes may be allowed for Intra 2N×2N, and only 35 directional intra prediction modes may be allowed for Intra N×N.

FIG. 5 is a flowchart briefly illustrating an intra prediction method according to an embodiment of the present invention.

Referring to FIG. 5, an intra prediction mode of the current block may be determined at step S500.

Specifically, the intra prediction mode of the current block may be derived based on a candidate list and an index. Here, the candidate list contains multiple candidates, and the multiple candidates may be determined based on an intra prediction mode of the neighboring block adjacent to the current block. The neighboring block may include at least one of blocks positioned at the top, the bottom, the left, the right, and the corner of the current block. The index may specify one of the multiple candidates of the candidate list. The candidate specified by the index may be set to the intra prediction mode of the current block.

An intra prediction mode used for intra prediction in the neighboring block may be set as a candidate. Also, an intra prediction mode having directionality similar to that of the intra prediction mode of the neighboring block may be set as a candidate. Here, the intra prediction mode having similar directionality may be determined by adding or subtracting a predetermined constant value to or from the intra prediction mode of the neighboring block. The predetermined constant value may be an integer, such as one, two, or more.

The candidate list may further include a default mode. The default mode may include at least one of a planar mode, a DC mode, a vertical mode, and a horizontal mode. The default mode may be adaptively added considering the maximum number of candidates that can be included in the candidate list of the current block.

The maximum number of candidates that can be included in the candidate list may be three, four, five, six, or more. The maximum number of candidates that can be included in the candidate list may be a fixed value preset in the device for encoding/decoding a video, or may be variably determined based on a characteristic of the current block. The characteristic may mean the location/size/shape of the block, the number/type of intra prediction modes that the block can use, etc. Alternatively, information indicating the maximum number of candidates that can be included in the candidate list may be signaled separately, and the maximum number of candidates that can be included in the candidate list may be variably determined using the information. The information indicating the maximum number of candidates may be signaled in at least one of a sequence level, a picture level, a slice level, and a block level.

When the extended intra prediction modes and the 35 pre-defined intra prediction modes are selectively used, the intra prediction modes of the neighboring blocks may be transformed into indexes corresponding to the extended intra prediction modes, or into indexes corresponding to the 35 intra prediction modes, whereby candidates can be derived. For transform to an index, a pre-defined table may be used, or a scaling operation based on a predetermined value may be used. Here, the pre-defined table may define a mapping relation between different intra prediction mode groups (e.g., extended intra prediction modes and 35 intra prediction modes).

For example, when the left neighboring block uses the 35 intra prediction modes and the intra prediction mode of the left neighboring block is 10 (a horizontal mode), it may be transformed into an index of 16 corresponding to a horizontal mode in the extended intra prediction modes.

Alternatively, when the top neighboring block uses the extended intra prediction modes and the intra prediction mode the top neighboring block has an index of 50 (a vertical mode), it may be transformed into an index of 26 corresponding to a vertical mode in the 35 intra prediction modes.

Based on the above-described method of determining the intra prediction mode, the intra prediction mode may be derived independently for each of the luma component and the chroma component, or the intra prediction mode of the chroma component may be derived depending on the intra prediction mode of the luma component.

Specifically, the intra prediction mode of the chroma component may be determined based on the intra prediction mode of the luma component as shown in the following Table 1.

TABLE 1

| Intra_chroma_pred_mode[xCb][yCb] | IntraPredModeY[xCb][yCb] | | | | |
|---|---|---|---|---|---|
| | 0 | 26 | 10 | 1 | X(0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode means information signaled to specify the intra prediction mode of the chroma component, and IntraPredModeY indicates the intra prediction mode of the luma component.

Referring to FIG. 5, a reference sample for intra prediction of the current block may be derived at step S510.

Specifically, a reference sample for intra prediction may be derived based on a neighboring sample of the current block. The neighboring sample may be a reconstructed sample of the neighboring block, and the reconstructed sample may be a reconstructed sample before an in-loop filter is applied or a reconstructed sample after the in-loop filter is applied.

A neighboring sample reconstructed before the current block may be used as the reference sample, and a neighboring sample filtered based on a predetermined intra filter may be used as the reference sample. The intra filter may include at least one of the first intra filter applied to multiple neighboring samples positioned on the same horizontal line and the second intra filter applied to multiple neighboring samples positioned on the same vertical line. Depending on the positions of the neighboring samples, one of the first intra filter and the second intra filter may be selectively applied, or both intra filters may be applied.

Filtering may be adaptively performed based on at least one of the intra prediction mode of the current block and the size of the transform block for the current block. For example, when the intra prediction mode of the current block is the DC mode, the vertical mode, or the horizontal mode, filtering may not be performed. When the size of the transform block is NxM, filtering may not be performed.

Here, N and M may be the same values or different values, or may be values of 4, 8, 16, or more. Alternatively, filtering may be selectively performed based on the result of a comparison of a pre-defined threshold and the difference between the intra prediction mode of the current block and the vertical mode (or the horizontal mode). For example, when the difference between the intra prediction mode of the current block and the vertical mode is greater than a threshold, filtering may be performed. The threshold may be defined for each size of the transform block as shown in Table 2.

TABLE 2

| | 8 × 8 transform | 16 × 16 transform | 32 × 32 transform |
|---|---|---|---|
| Threshold | 7 | 1 | 0 |

The intra filter may be determined as one of multiple intra filter candidates pre-defined in the device for encoding/decoding a video. To this end, an index specifying an intra filter of the current block among the multiple intra filter candidates may be signaled. Alternatively, the intra filter may be determined based on at least one of the size/shape of the current block, the size/shape of the transform block, information on the filter strength, and variations of the neighboring samples.

Referring to FIG. 5, intra prediction may be performed using the intra prediction mode of the current block and the reference sample at step S520.

That is, the prediction sample of the current block may be obtained using the intra prediction mode determined at step S500 and the reference sample derived at step S510. However, in the case of intra prediction, a boundary sample of the neighboring block may be used, and thus quality of the prediction picture may be decreased. Therefore, a correction process may be performed on the prediction sample generated through the above-described prediction process, and will be described in detail with reference to FIGS. 6 to 15. However, the correction process is not limited to being applied only to the intra prediction sample, and may be applied to an inter prediction sample or the reconstructed sample.

FIG. 6 is a view illustrating a method of correcting a prediction sample of a current block based on differential information of neighboring samples according to an embodiment of the present invention.

The prediction sample of the current block may be corrected based on the differential information of multiple neighboring samples for the current block. The correction may be performed on all prediction samples in the current block, or may be performed on prediction samples in some predetermined regions. Some regions may be one row/column or multiple rows/columns, or may be preset regions for correction in the device for encoding/decoding a video, or may be variably determined based on at least one of the size/shape of the current block and the intra prediction mode.

The neighboring samples may belong to the neighboring blocks positioned at the top, the left, and the top left corner of the current block. The number of neighboring samples used for correction may be two, three, four, or more. The positions of the neighboring samples may be variably determined depending on the position of the prediction sample which is the correction target in the current block. Alternatively, some of the neighboring samples may have fixed positions regardless of the position of the prediction sample which is the correction target, and the remaining neighboring samples may have positions variably depending on the position of the prediction sample which is the correction target.

The differential information of the neighboring samples may mean a differential sample between the neighboring samples, or may mean a value obtained by scaling the differential sample by a predetermined constant value (e.g., one, two, three, etc.). Here, the predetermined constant value may be determined considering the position of the prediction sample which is the correction target, the position of the column or row including the prediction sample which is the correction target, the position of the prediction sample within the column or row, etc.

For example, when the intra prediction mode of the current block is the vertical mode, differential samples between the top left neighboring sample $p(-1, -1)$ and neighboring samples $p(-1, y)$ adjacent to the left boundary of the current block may be used to obtain the final prediction sample as shown in Formula 1. (y=0 ... N-1)

$$P'(0,y)=P(0,y)+((p(-1,y)-p(-1,-1))>>1 \quad \text{[Formula 1]}$$

For example, when the intra prediction mode of the current block is the horizontal mode, differential samples between the top left neighboring sample $p(-1, -1)$ and neighboring samples $p(x, -1)$ adjacent to the top boundary of the current block may be used to obtain the final prediction sample as shown in Formula 2. (x=0 ... N-1)

$$P'(x,0)=p(x,0)+((p(x,-1)-p(-1,-1))>>1 \quad \text{[Formula 2]}$$

For example, when the intra prediction mode of the current block is the vertical mode, differential samples between the top left neighboring sample $p(-1, -1)$ and neighboring samples $p(-1, y)$ adjacent to the left boundary of the current block may be used to obtain the final prediction sample. Here, the differential sample may be added to the prediction sample, or the differential sample may be scaled by a predetermined constant value, and then added to the prediction sample. The predetermined constant value used in scaling may be determined differently depending on the column and/or row. For example, the prediction sample may be corrected as shown in Formula 3 and Formula 4. (y=0 ... N-1)

$$P'(0,y)=P(0,y)+((p(-1,y)-p(-1,-1))>>1 \quad \text{[Formula 3]}$$

$$P'(1,y)=P(1,y)+((p(-1,y)-p(-1,-1))>>2 \quad \text{[Formula 4]}$$

For example, when the intra prediction mode of the current block is the horizontal mode, differential samples between the top left neighboring sample $p(-1, -1)$ and neighboring samples $p(x, -1)$ adjacent to the top boundary of the current block may be used to obtain the final prediction sample, as described in the case of the vertical mode.

For example, the prediction sample may be corrected as shown in Formula 5 and Formula 6. (x=0 N-1)

$$P'(x,0)=p(x,0)+((p(x,-1)-p(-1,-1))>>1 \quad \text{[Formula 5]}$$

$$P'(x,1)=p(x,1)+((p(x,-1)-p(-1,-1))>>1 \quad \text{[Formula 6]}$$

FIGS. 7 and 8 are views illustrating a method of correcting a prediction sample based on a predetermined correction filter according to an embodiment of the present invention.

The prediction sample may be corrected based on the neighboring sample of the prediction sample which is the correction target and a predetermined correction filter. Here, the neighboring sample may be specified by an angular line of the directional prediction mode of the current block, or may be at least one sample positioned on the same angular line as the prediction sample which is the correction target. Also, the neighboring sample may be a prediction sample in the current block, or may be a reconstructed sample in a neighboring block reconstructed before the current block.

At least one of the number of taps, strength, and a filter coefficient of the correction filter may be determined based on at least one of the position of the prediction sample which is the correction target, whether or not the prediction sample which is the correction target is positioned on the boundary of the current block, the intra prediction mode of the current block, angle of the directional prediction mode, the prediction mode (inter or intra mode) of the neighboring block, and the size/shape of the current block.

Referring to FIG. 7, when the directional prediction mode has an index of 2 or 34, at least one prediction/reconstructed sample positioned at the bottom left of the prediction sample which is the correction target and the predetermined correction filter may be used to obtain the final prediction sample. Here, the prediction/reconstructed sample at the bottom left may belong to a previous line of a line including the prediction sample which is the correction target. The prediction/reconstructed sample at the bottom left may belong to the same block as the current sample, or to neighboring block adjacent to the current block.

Filtering for the prediction sample may be performed only on the line positioned at the block boundary, or may be performed on multiple lines. The correction filter where at least one of the number of filter taps and a filter coefficient is different for each of lines may be used. For example, a ($\frac{1}{2}$, $\frac{1}{2}$) filter may be used for the left first line closest to the block boundary, a ($\frac{12}{16}$, $\frac{4}{16}$) filter may be used for the second line, a ($\frac{14}{16}$, $\frac{2}{16}$) filter may be used for the third line, and a ($\frac{15}{16}$, $\frac{1}{16}$) filter may be used for the fourth line.

Alternatively, when the directional prediction mode has an index of 3 to 6 or 30 to 33, filtering may be performed on the block boundary as shown in FIG. 8, and a 3-tap correction filter may be used to correct the prediction sample. Filtering may be performed using the bottom left sample of the prediction sample which is the correction target, the bottom sample of the bottom left sample, and a 3-tap correction filter that takes as input the prediction sample which is the correction target. The position of neighboring sample used by the correction filter may be determined differently based on the directional prediction mode. The filter coefficient of the correction filter may be determined differently depending on the directional prediction mode.

Different correction filters may be applied depending on whether the neighboring block is encoded in the inter mode or the intra mode. When the neighboring block is encoded in the intra mode, a filtering method where more weight is given to the prediction sample may be used, compared to when the neighboring block is encoded in the inter mode. For example, in the case of that the intra prediction mode is 34, when the neighboring block is encoded in the inter mode, a (½, ½) filter may be used, and when the neighboring block is encoded in the intra mode, a (4/16, 12/16) filter may be used.

The number of lines to be filtered in the current block may vary depending on the size/shape of the current block (e.g., the coding block or the prediction block). For example, when the size of the current block is equal to or less than 32×32, filtering may be performed on only one line at the block boundary; otherwise, filtering may be performed on multiple lines including the one line at the block boundary.

FIGS. 7 and 8 are based on the case where the 35 intra prediction modes in FIG. 4 are used, but may be equally/similarly applied to the case where the extended intra prediction modes are used.

FIG. 9 is a view illustrating a method of correcting a prediction sample using weight and offset according to an embodiment of the present invention.

There may be a case that the encoding is not performed in intra prediction or in inter prediction, even though the current block is similar to a collocated block of the previous frame since brightness changes between the previous frame and the current frame occurs or that quality of the prediction picture encoded in intra prediction or in inter prediction may be relatively low. In this case, the weight and offset for brightness compensation may be applied to the prediction sample such that quality of the prediction picture can be enhanced.

Referring to FIG. 9, at least one of the weight w and offset f may be determined at step S900.

At least one of the weight w and offset f may be signaled in at least one of a sequence parameter set, a picture parameter set, and a slice header. Alternatively, at least one of the weight w and offset f may be signaled in predetermined block units sharing the same, and multiple blocks (e.g., the CU, the PU, and the TU) belonging to a predetermined block unit may share one signaled weight w and/or offset f.

At least one of the weight w and offset f may be signaled regardless of the prediction mode of the current block, or may be signaled selectively considering the prediction mode. For example, when the prediction mode of the current block is the inter mode, the weight w and/or offset f may be signaled; otherwise, it may not be signaled. Here, the inter mode may include at least one of the skip mode, the merge mode, the AMVP mode, and the current picture reference mode. The current picture reference mode may mean a prediction mode using a pre-reconstructed region in the current picture including the current block. A motion vector for the current picture reference mode may be used to specify the pre-reconstructed region. A flag or index indicating whether the current block is encoded in the current picture reference mode may be signaled, or may be derived through a reference picture index of the current block. The current picture for the current picture reference mode may exist at a fixed position (e.g., the position with refIdx=0 or the last position) in the reference picture list of the current block. Alternatively, the current picture may be variably positioned in the reference picture list, and to this end, a separate reference picture index indicating the position of the current picture may be signaled.

The weight may be derived using brightness change between the first template in a particular shape adjacent to the current block and the second template corresponding thereto adjacent to the previous block. The second template may include an unavailable sample. In this case, an available sample may be copied to the position of the unavailable sample, or the available sample may be used which is derived through interpolation between multiple available samples. Here, the available sample may be included in the second template or the neighboring block. At least one of the coefficient, the shape, and the number of taps of the filter used in interpolation may be determined variably based on the size and/or shape of the template. A method of composing a template will be described in detail with reference to FIGS. 10 to 15.

For example, when the neighboring sample of the current block is designated by $y_i$ (i ranging 0 to N−1) and the neighboring sample of the collocated block is designated by $x_i$ (i ranging 0 to N−1), the weight w and offset f may be derived as follows.

Using a particular-shaped template adjacent to the current block, the weight w and offset f may be derived by obtaining the minimum value of E(w, f) in Formula 7.

$$E(w,f)=\Sigma_i(p_i-(wp_i-f))^2+\lambda(w-1)^2 \quad \text{[Formula 7]}$$

Formula 7 for obtaining the minimum value may be changed to Formula 8.

$$\begin{pmatrix} \sum_i x_j x_j + \lambda & \sum_i x_i \\ \sum_i x_i & \sum_i 1 \end{pmatrix} \begin{pmatrix} w \\ f \end{pmatrix} = \begin{pmatrix} \sum_i x_i y_i + \lambda \\ \sum_i y_i \end{pmatrix} \quad \text{[Formula 8]}$$

Formula 9 for deriving the weight w and Formula 10 for deriving the offset f may be obtained from Formula 8.

$$w = \frac{N\sum_i x_i y_i - \sum_i x_i \sum_i y_i + \lambda}{N\sum_i x_i x_j - \sum_i x_j \sum_i x_i + \lambda} \quad \text{[Formula 9]}$$

$$f = \sum_i y_i - a * \sum_i x_i \quad \text{[Formula 10]}$$

Referring to FIG. 9, at least one of the weight and offset determined at step S900 may be used to correct the prediction sample.

For example, when brightness change occurs at the entire frames, the weight w and offset f are applied to the prediction sample p generated through intra prediction such that a corrected prediction sample p' may be obtained as shown in Formula 11.

$$p'=w\times p+f \quad \text{[Formula 11]}$$

Here, the weight w and offset f may be applied to the prediction sample generated through inter prediction, or may be applied to the reconstructed sample.

FIGS. 10 to 15 are views illustrating a method of composing a template to determine weight w according to an embodiment of the present invention.

Referring to the left of FIG. 10, a template may be composed of all neighboring samples adjacent to the current block, or a template may be composed of some samples sub-sampled from the neighboring samples adjacent to the current block. The middle of FIG. 10 shows an example of ½ sub-sampling, and a template may be composed of only samples in gray. Instead of ½ sub-sampling, the template may be composed using ¼ sub-sampling or ⅛ sub-sampling. As shown in the right of FIG. 10, a template may be composed of all neighboring samples adjacent to the current block except for the sample positioned at the top left. Not shown in FIG. 10, considering the position of the current block in the picture or a coding tree block (largest coding unit), a template composed of only the samples positioned on the left or a template composed of only the samples positioned at the top may be used.

Referring to FIG. 11, the template may be composed by increasing the number of neighboring samples. That is, the template in FIG. 11 may be composed of the first neighboring samples adjacent to the boundary of the current block and the second neighboring samples adjacent to the first neighboring samples.

As shown in the left of FIG. 11, a template may be composed of all neighboring samples belonging to two lines adjacent to the boundary of the current block, or as shown in the middle of FIG. 11, a template may be composed by sub-sampling the template in the left. As shown in the right of FIG. 11, a template may be composed excluding four samples belonging to the top left. Not shown in FIG. 11, considering the position of the current block in the picture or a coding tree block (largest coding unit), a template composed of only the samples positioned on the left or a template composed of only the samples positioned at the top may be used.

Alternatively, different templates may be composed depending on the size and/or shape of the current block (whether the current block has a square shape whether the current block is symmetrically partitioned). For example, as shown in FIG. 12, a sub-sampling rate of the template may be applied differently depending on the size of the current block. For example, as shown in the left of FIG. 12, when the size of the block is equal to or less than 64×64, a ½ sub-sampled template may be composed. As shown in the right of FIG. 12, when the size of the block is equal to or greater than 128×128, a ¼ sub-sampled template may be composed.

Referring to FIG. 13, the template may be composed by increasing the number of neighboring samples adjacent to the current block depending on the size thereof.

Multiple template candidates that can be used in a sequence or slice may be determined, and one of the multiple template candidates may be selectively used. The multiple template candidates may include templates which have a different shape and/or size for each other. Information on the shape and/or size of the template may be signaled in a sequence header or slice header. In the device for encoding/decoding a video, an index may be assigned to each template candidate. In order to identify a template candidate to be used in the current sequence, picture, or slice among the multiple template candidates, syntax type_weight_pred_template_idx may be encoded. The device for decoding a video may use the template candidate selectively based on the syntax type_weight_pred_template_idx.

For example, as shown in FIG. 14, the template of the middle of FIG. 10 may be assigned to 0, the template of the right of FIG. 10 may be assigned to 1, the template of the middle of FIG. 11 may be assigned to 2, and the template of the right of FIG. 11 may be assigned to 3. The template used in the sequence may be signaled.

When performing weighted prediction using a non-square block, the template may be composed by applying different sub-sampling rates to long and short sides such that the total number of templates is 2'N. For example, as shown in FIG. 15, the template may be composed by performing ½ sub-sampling on the short side and ¼ sub-sampling on the long side.

When performing intra prediction on the current block based on the directional intra prediction mode, the generated prediction sample may not reflect the characteristics of the original picture since the range of the reference sample being used is limited (e.g., intra prediction is performed only using the neighboring samples adjacent to the current block). For example, when an edge exists in the current block or when a new object appears around the boundary of the current block, the difference between the prediction sample and the original picture may be large depending on the position of the prediction sample in the current block.

In this case, the residual value is relatively large, and thus the number of bits to be encoded/decoded may increase. Particularly, the residual value in a region relatively far from the boundary of the current block may include a large amount of high-frequency components, which may result in degradation of encoding/decoding efficiency.

In order to solve the above problems, a method of generating or updating the prediction sample in sub-block units may be used. According to this, prediction accuracy in a region relatively far from the block boundary may be enhanced.

For convenience of explanation, in the following embodiments, a prediction sample generated based on the directional intra prediction mode is referred to as the first prediction sample. Also, a prediction sample generated based on a non-directional intra prediction mode or a prediction sample generated by performing inter prediction may also be included in a category of the first prediction sample.

A method of correcting the prediction sample based on the offset will be described in detail with reference to FIG. 16.

FIG. 16 is a view illustrating a method of correcting a prediction sample based on offset according to an embodiment of the present invention.

Referring to FIG. 16, for the current block, whether to update the first prediction sample using the offset may be determined at step S1600. Whether to update the first prediction sample using the offset may be determined by a flag decoded from a bitstream. For example, syntax 'is_sub_block_refinement_flag' indicating whether to update the first prediction sample using the offset may be signaled through a bitstream. When the value of is_sub_block_refinement_flag is one, the method of updating the first prediction sample using the offset may be used in the current block. When the value of is_sub_block_refinement_flag is zero, the method of updating the first prediction sample using the offset may not be used in the current block. However, step S1600 is intended to selectively perform updating of the first prediction sample, and is not an essential configuration for achieving the purpose of the present invention, so that step S1600 may be omitted in some cases.

When determining that the method of updating the first prediction sample using the offset is used, an intra prediction pattern of the current block may be determined at step S1610. Through the intra prediction pattern, all or some regions of the current block to which the offset is applied, the partitioning shape of the current block, whether to apply the offset to a sub-block included in the current block, the size/sign of the offset assigned to each sub-block, etc. may be determined.

One of multiple patterns pre-defined in the device for encoding/decoding a video may be selectively used as the intra prediction pattern of the current block, and to this end, an index specifying the intra prediction pattern of the current block may be signaled from a bitstream. As another example, the intra prediction pattern of the current block may be determined based on the partition mode of the prediction unit or the coding unit of the current block, the size/shape of the block, whether being in the directional intra prediction mode, the angle of the directional intra prediction mode, etc.

Whether or not the index indicating the intra prediction pattern of the current block is signaled may be determined by predetermined flag information signaled from a bitstream. For example, when the flag information indicates that index indicating the intra prediction pattern of the current block is signaled from a bitstream, the intra prediction pattern of the current block may be determined based on an index decoded from a bitstream. Here, the flag information may be signaled in at least one of a picture level, a slice level, and a block level.

When the flag information indicates that the index indicating the intra prediction pattern of the current block is not signaled from a bitstream, the intra prediction pattern of the current block may be determined based on above mentioned the partition mode of the prediction unit or the coding unit of the current block, etc. For example, the pattern in which the current block is partitioned into sub-blocks may be the same as the pattern in which the coding block is partitioned into prediction units.

When the intra prediction pattern of the current block is determined, the offset may be obtained in sub-block units at step S1620. The offset may be signaled in units of a slice, a coding unit, or a prediction unit. As another example, the offset may be derived from the neighboring sample of the current block. The offset may include at least one of offset value information and offset sign information. Here, the offset value information may be in a range of integers equal to or greater than zero.

When the offset is determined, the second prediction sample may be obtained for each sub-block at step S1630. The second prediction sample may be obtained by applying the offset to the first prediction sample. For example, the second prediction sample may be obtained adding or subtracting the offset to or from the first prediction sample.

FIGS. 17 to 21 are views illustrating examples of an intra prediction pattern of a current block according to an embodiment of the present invention.

For example, in the example shown in FIG. 17, when the index is '0' or '1', the current block may be partitioned into upper and lower sub-blocks. The offset may be not set to the upper sub-block, and the offset 'f' may be set to the lower sub-block. Therefore, the first prediction sample(P(i,j)) may be intactly used in the upper sub-block, and the second prediction sample(P(i,j)+f or P(i,j)−f) that is generated adding or subtracting the offset to or from the first prediction sample may be used in the lower sub-block. In the present invention, 'not set' may mean that the offset is not assigned to the block, or the offset having the value of '0' may be assigned to the block.

When the index is '2' or '3', the current block is partitioned into left and right sub-blocks. The offset may not be set to the left sub-block, and the offset 'f' may be set to the right sub-block. Therefore, the first prediction sample(P(i,j)) may be intactly used in the left sub-block, and the second prediction sample(P(i,j)+f or P(i,j)−f) that is generated adding or subtracting the offset to or from the first prediction sample may be used in the right sub-block.

The range of available intra prediction patterns may be limited based on the intra prediction mode of the current block. For example, when the intra prediction mode of the current block is a vertical direction intra prediction mode or a prediction mode in a direction similar to the vertical direction intra prediction mode (e.g., among the 33 directional prediction modes, when the intra prediction mode has an index of 22 to 30), only the intra prediction pattern partitioning the current block in a horizontal direction (e.g., the index 0 or index 1 in FIG. 17) may be applied to the current block.

As another example, when the intra prediction mode of the current block is a horizontal direction intra prediction mode or a prediction mode in a direction similar to the horizontal direction intra prediction mode (e.g., among the 33 directional prediction modes, when the intra prediction mode has an index of 6 to 14), only the intra prediction pattern partitioning the current block in a vertical direction (e.g., the index 2 or index 3 in FIG. 17) may be applied to the current block.

In FIG. 17, the offset is not set to one of the sub-blocks included in the current block, and the offset is set to another one. Whether to set the offset to the sub-block may be determined based on information signaled for each sub-block.

Whether to set the offset to the sub-block may be determined based on the position of the sub-block, an index for identifying the sub-block in the current block, etc. For example, based on a predetermined boundary of the current block, the offset may not set to the sub-block which adjacent to the predetermined boundary, and the offset may be set to the sub-block which is not adjacent to the predetermined boundary.

When assuming that the predetermined boundary is the top boundary of the current block, under the intra prediction pattern corresponding to the index '0' or '1', the offset may be not set to the sub-block which is adjacent to the top boundary of the current block, and the offset may be set to the sub-block which is not adjacent to the top boundary of the current block.

When assuming that the predetermined boundary is the left boundary of the current block, under the intra prediction pattern corresponding to the index '2' or '3', the offset may not be set to the sub-block which is adjacent to the left boundary of the current block, and the offset may be set to the sub-block which is not adjacent to the left boundary of the current block.

In FIG. 17, it is assumed that the offset is not set to the one of the sub-blocks included in the current block and the offset is set to another one. As another example, different values of the offset may be set to the sub-blocks included in the current block.

An example where different offset is set for each sub-block will be described with reference to FIG. 18.

Referring to FIG. 18, when the index is '0' or '1', the offset 'h' may be set to the upper sub-block of the current block, and the offset 'f' may be set to the lower sub-block of the current block. Therefore, the second prediction sample (P(i,j)+h or P(i,j)−h) obtained by adding or subtracting the offset 'h' to or from the first prediction sample may be generated in the upper sub-block, and the second prediction sample(P(i,j)+f or P(i,j)−f) obtained by adding or subtracting the offset 'f' to or from the first prediction sample may be generated in the lower sub-block.

Referring to FIG. 18, when the index is '2' or '3', the offset 'h' may be set to the left sub-block of the current block, and the offset 'f' may be set to the right sub-block of the current block. Therefore, the second prediction sample (P(i,j)+h or P(i,j)−h) obtained by adding or subtracting the offset 'h' to or from the first prediction sample may be generated in the left sub-block, and the second prediction sample(P(i,j)+f or P(i,j)−f) obtained by adding or subtracting the offset 'f' to or from the first prediction sample may be generated in the right sub-block.

In FIGS. 17 and 18, the current block is partitioned into two sub-blocks having the same size, but the number of sub-blocks and/or the size of sub-blocks included in the current block is not limited to the examples shown in FIGS. 17 and 18. The number of sub-blocks included in the current block may be three or more, and the sub-blocks may be different sizes.

When multiple intra prediction patterns are available, the available intra prediction patterns may be grouped into multiple categories. In this case, the intra prediction pattern of the current block may be selected based on the first index for identifying a category and the second index identifying an intra prediction pattern in the category.

An example where the intra prediction pattern of the current block is determined based on the first index and the second index will be described with reference to FIG. 19.

In the example shown in FIG. 19, 12 intra prediction patterns may be classified into three categories each including four intra prediction patterns. For example, intra prediction patterns corresponding to indexes 0 to 3 may be classified as a category 0, intra prediction patterns corresponding to indexes 4 to 7 may be classified as a category 1, and intra prediction patterns corresponding to indexes 8 to 11 may be classified as a category 2.

The device for decoding a video may decode the first index from a bitstream in order to specify the category including at least one intra prediction pattern. In the example shown in FIG. 19, the first index may specify one of the categories 0, 1, and 2.

When the category is specified based on the first index, the intra prediction pattern of the current block may be determined based on the second index decoded from a bitstream. When the category 1 is specified by the first index, the second index may specify one of the four intra prediction patterns (i.e., the index 4 to index 7) of the category 1.

In FIG. 19, categories include the same numbers of intra prediction patterns, but the categories do not necessarily include the same numbers of intra prediction patterns.

The number of available intra prediction patterns or of the number of categories may be determined in units of a sequence or a slice. Also, at least one of the number of available intra prediction patterns and the number of categories may be signaled through a sequence header or a slice header.

As another example, the number of available intra prediction patterns and/or the number of categories may be determined based on the size of the prediction unit or the coding unit of the current block. For example, when the size of the current block (e.g., the coding unit of the current block) is equal to or greater than 64×64, the intra prediction pattern of the current block may be selected from five intra prediction patterns shown in FIG. 20. In contrast, when the size of the current block (e.g., the coding unit of the current block) is less than 64×64, the intra prediction pattern of the current block may be selected from intro prediction patterns shown in FIG. 17, 18, or 19.

In FIGS. 17 to 20, the sub-blocks included in each intra prediction pattern are in the rectangular shape. As another example, the intra prediction pattern where at least one of the sizes and shapes of the sub-blocks different from each other may be used. For example, FIG. 22 is a view illustrating an example of an intra prediction pattern with different sizes and shapes of sub-blocks.

The offset for each sub-block (e.g., the offset h, f, g, or i of each sub-block shown in FIGS. 17 to 21) may be decoded from a bitstream, or may be derived from the neighboring sample adjacent to the current block.

As another example, the offset of the sub-block may be determined considering the distance from a sample at a particular position in the current block. For example, the offset may be determined in proportion to a value representing the distance between a sample at a predetermined position in the current block and a sample at a predetermined position in the sub-block.

As another example, the offset of the sub-block may be determined adding or subtracting a value determined based on the distance between a sample at a predetermined position in the current block and a sample at a predetermined position in the sub-block to or from a pre-set value.

As another example, the offset may be determined based on a ratio of a value representing the size of the current block and a value representing the distance between a sample at a predetermined position in the current block and a sample at a predetermined position in the sub-block.

Here, the sample at the predetermined position in the current block may include a sample adjacent to the left boundary of the current block, a sample positioned at the top boundary of the current block, a sample adjacent to the top left corner of the current block, etc.

FIG. 22 is a view illustrating a method of performing prediction using an intra block copy technique according to an embodiment of the present invention.

Intra block copy (IBC) is a method where the current block (hereinafter, referred to as 'a reference block') is predicted/reconstructed using a block already reconstructed in the same picture as the current block. When a picture contains a large number of letters, such as Korean alphabet, an alphabet, etc. and letters contained in reconstructing the current block are contained in an already decoded block, intra block copy can enhance an encoding/decoding performance.

An intra block copy method may be classified as an intra prediction method or an inter prediction method. When the intra block copy method is classified as the intra prediction method, an intra prediction mode for the intra block copy method may be defined. When the intra block copy method is classified as the inter prediction method, a bitstream may include a flag indicating whether to apply the intra block copy method to the current block. Alternatively, whether the current block uses intra block copy may be confirmed through a reference picture index of the current block. That is, when the reference picture index of the current block indicates the current picture, inter prediction may be performed on the current block using intra block copy. To this end, a pre-reconstructed current picture may be added to a reference picture list for the current block. The current picture may exist at a fixed position in the reference picture list (e.g., a position with the reference picture index of 0 or the last position). Alternatively, the current picture may exist differently in the reference picture list, and to this end, a separate reference picture index indicating the position of the current picture may be signaled.

In order to specify the reference block of the current block, the position difference between the current block and the reference block may be defined as a motion vector (hereinafter, referred to as a block vector).

The block vector may be derived by a sum of a prediction block vector and a differential block vector. The device for encoding a video may generate the prediction block vector through predictive coding, and may encode the differential block vector indicating the difference between the block vector and the prediction block vector. In this case, the device for decoding a video may derive the block vector of the current block by using the prediction block vector derived using pre-decoded information and the differential block vector decoded from a bitstream.

Here, the prediction block vector may be derived based on the block vector of the neighboring block adjacent to the current block, the block vector in an LCU of the current block, the block vector in an LCU row/column of the current block, etc.

The device for encoding a video may encode the block vector without performing predictive coding of the block vector. In this case, the device for decoding a video may obtain the block vector by decoding block vector information signaled through a bitstream. The correction process may be performed on the prediction/reconstructed sample generated through the intra block copy method. In this case, the correction method described with reference to FIGS. 6 to 21 may be equally/similarly applied, and thus detailed description thereof will be omitted.

The device for encoding a video may generate a bitstream by performing binarizaton on a symbol, such as a transform coefficient, a motion vector difference, a syntax in a slice, etc., and performing arithmetic coding on binary values. Here, for compression of a symbol, a context may be determined considering the value of the same symbol of the neighboring block, information on the neighboring block, the position of the current block, etc. When a probability index is determined based on the selected context, the occurrence probability of the symbol may be determined based on the determined probability index. Next, the compression performance of the symbol can be enhanced through cumulative statistics of internal symbols, the occurrence probability recalculated based on the value of the encoded symbol, and arithmetic coding. As an example of the arithmetic coding method, CABAC may be used.

An example of encoding a symbol in the device for encoding a video will be described in detail with reference to FIG. 23. A detailed description of decoding the symbol in the device for decoding a video is omitted, but the decoding of the symbol may be performed by the device for decoding a video through the inverse process of the following embodiments.

FIG. 23 is a flowchart illustrating a process of encoding a symbol.

The device for encoding a video may binarize the symbol at step S2300. When an encoding target symbol is not a binary symbol, the device for encoding a video may convert the symbol to a binary symbol. For example, the device for encoding a video may binarize a non-binary symbol, such as a transform coefficient, a motion vector difference, etc., to a binary symbol consisting of the values of 0 and 1. When the symbol is binarized, among mapped codewords, the bit having '0' or '1' may be referred to as a bin.

Symbol binarization may be performed through Unary binarization, truncated unary binarization, etc.

Table 3 shows a unary binarization method, and Table 4 shows a truncated unary binarization method when the maximum bit length (cMax) is six.

TABLE 3

| Symbol | Binarization |
| --- | --- |
| 0 | 0 |
| 1 | 10 |
| 2 | 110 |
| 3 | 1110 |
| ... | ... |

TABLE 4

| Symbol | Binarization |
| --- | --- |
| 0 | 0 |
| 1 | 10 |
| 2 | 110 |
| 3 | 1110 |
| 4 | 11110 |
| 5 | 111110 |
| 6 | 111111 |

When symbol binarization is completed, a context model is selected at step S2310. The context model represents a probability model for each symbol. The occurrence probability of 0 or 1 in the bin may differ for each context model. In the following embodiments, the occurrence probability of the symbol may indicate the occurrence probability of 0 or 1 in the bin. In HEVC, about 400 independent contexts for various symbols exist.

When starting encoding of the slice, the probability index (pStateIdx) for each context may be initialized based on at least one of the quantization parameter (Qp) and the slice type (I, P, or B).

In the case of using a tile, when starting encoding of the tile, the probability index for each context may be initialized based on at least one of the quantization parameter (Qp) and the slice type (I, P, or B).

Next, based on the selected context model, arithmetic coding for each symbol may be performed at step S2320. Arithmetic coding of the symbol may be performed for each context model. Therefore, even with the same symbols, when different contexts are used, it may not affect probability updating and bitstream encoding. When the occurrence probability of the symbol is determined, encoding may be performed depending on the occurrence probability of the symbol and the value of each symbol. Here, the number of encoding bits may be determined differently depending on the value of each symbol. That is, when the value of each symbol has a high occurrence probability, the symbol may be compressed into a small number of bits. For example, when the value of each symbol has a high occurrence probability, the symbol having ten bins may be encoded into less than ten bits.

The interval between [0,1) is divided into sub-intervals based on the occurrence probability of the symbol, and among real numbers belonging to the divided sub-intervals, a number that can be represented by the least number of bits and the coefficient thereof are selected, whereby the symbol can be encoded. In dividing the interval between [0,1) into sub-intervals, when the occurrence probability of the symbol is large, a long sub-interval may be assigned, and when the occurrence probability of the symbol is low, a small sub-interval may be assigned.

FIG. 24 is a view illustrating an example of dividing the interval between [0,1) into sub-intervals based on the occurrence probability of a symbol. Arithmetic coding of the symbol '010' when the occurrence probability of 1 is 0.2 and the occurrence probability of 0 is 0.8 will be described.

Since the first bin of the symbol '010' is '0' and the occurrence probability of '0' is 0.8, the interval [0,1) may be updated to [0, 0.8).

Since the second bin of the symbol '010' is '1' and the occurrence probability of '1' is 0.2, the interval [0, 0.8) may be updated to [0.64, 0.8).

Since the third bin of the symbol '010' is '0' and the occurrence probability of '0' is 0.8, the interval [0.64, 0.8) may be updated to [0.64, 0.768).

In the interval [0.64, 0.768), a number that can be represented by the least number of bits is selected. In the interval [0.64, 0.768), 0.75=1×(½)+1×(1.2)^2 so that the symbol '010' may be encoded into binary '11' excluding 0.

A most probable symbol (MPS) means a symbol having a high occurrence frequency between 0 and 1, and a least probable symbol (LPS) means a symbol having a low occurrence frequency between 0 and 1. Occurrence probability initial values of the MPS and LPS may be determined based on the context and the quantization parameter (Qp) value.

In FIG. 24, for each bin, it is assumed that the occurrence probabilities of 0 and 1 are fixed, but MPS occurrence probability and LPS occurrence probability of the symbol may be updated depending on whether the current encoded bin is the MPS or LPS.

For example, when a binarization value of the bin of the symbol to be current encoded is equal to the MPS, an MPS probability value of the symbol may increase while an LPS probability value may decrease. In contrast, when the binarization value of the bin of the symbol to be current encoded is equal to the LPS, the MPS probability value of the symbol may decrease while the LPS probability value may increase.

In CABAC, 64 MPS occurrence probabilities and LPS occurrence probabilities are defined, but a smaller or greater number of MPS occurrence probabilities or LPS occurrence probabilities may be defined and used. The MPS occurrence probabilities and LPS occurrence probabilities may be specified by an index (pStateIdx) indicating the occurrence probability of the symbol. When the value of the index indicating the occurrence probability of the symbol is large, the occurrence probability of the MPS is high.

Table 5 is intended to explain an example of updating a probability index (pStateIdx).

pStateIdx may be updated to the index 13 corresponding to transIdxLPS. When pStateIdx is updated, the occurrence probabilities of the MPS and LPS may be updated.

When the value of pStateIdx is 0, the occurrence probability of the MPS is 0.5. In this state, when the LPS is encoded, the frequency of the LPS may increase compared to the MPS. Therefore, when the value of pStateIdx is 0 and the LPS is encoded, the MPS and the LPS may be interchanged with each other.

The value of the probability index for each context may be initialized in units of a slice or a tile. Since the probability index is initialized in slice units, the current slice may be decoded regardless of whether the previous slice or the previous frame is encoded. However, when the symbol is encoded using an initialized probability index, the probability specified by the initialized probability index does not properly reflect the actual occurrence probability of the symbol, and thus initial encoding efficiency of the slice may be decreased.

In order to solve the problem, the probability index accumulated at a predetermined point during encoding/decoding the previous slice may be set to an initial value of the probability index of the current slice. Here, the predetermined point may indicate a start point of encoding/decoding a block positioned at a particular position (e.g., the middle position) in the slice in scan order. The probability value or probability index accumulated in the previous slice may be directly encoded/decoded through the header of the current slice, etc.

As another example, multiple probability indexes may be assigned to one context so as to determine the initial probability index of the slice differently. For example, when multiple probability indexes having different values exist for an arbitrary context (ctx), one of the multiple probability

TABLE 5

| | | | | | | | pStateIdx | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| transIdxLPS | 0 | 0 | 1 | 2 | 2 | 4 | 4 | 5 | 6 | 7 | 8 | 9 | 9 | 11 | 11 | 12 |
| transIdxMPS | 1 | 2 | 3 | 4 | 5 | 6 | 7 | 8 | 9 | 10 | 11 | 12 | 13 | 14 | 15 | 16 |

| | | | | | | | pStateIdx | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| transIdxLPS | 13 | 13 | 15 | 15 | 16 | 16 | 18 | 18 | 19 | 19 | 21 | 21 | 22 | 22 | 23 | 24 |
| transIdxMPS | 17 | 18 | 19 | 20 | 21 | 22 | 23 | 24 | 25 | 26 | 27 | 28 | 29 | 30 | 31 | 32 |

| | | | | | | | pStateIdx | | | | | | | | | |
|---|---|---|---|---|---|---|---|---|---|---|---|---|---|---|---|---|
| | 32 | 33 | 34 | 35 | 36 | 37 | 38 | 39 | 40 | 41 | 42 | 43 | 44 | 45 | 46 | 47 |
| transIdxLPS | 24 | 25 | 26 | 26 | 27 | 27 | 28 | 29 | 29 | 30 | 30 | 30 | 31 | 21 | 32 | 33 |
| transIdxMPS | 33 | 34 | 35 | 36 | 37 | 38 | 39 | 40 | 41 | 42 | 43 | 44 | 45 | 46 | 47 | 48 |

| | | | | | | pStateIdx | | | | | | | | |
|---|---|---|---|---|---|---|---|---|---|---|---|---|---|---|---|
| | 48 | 49 | 50 | 51 | 52 | 53 | 54 | 55 | 56 | 57 | 58 | 59 | 60 | 61 | 62 | 63 |
| transIdxLPS | 33 | 33 | 34 | 34 | 35 | 35 | 35 | 36 | 36 | 36 | 37 | 37 | 37 | 38 | 38 | 63 |
| transIdxMPS | 49 | 50 | 51 | 52 | 53 | 54 | 55 | 56 | 57 | 58 | 59 | 60 | 61 | 62 | 62 | 63 |

When the MPS is encoded, a probability index (pStateIdx) indicating the probability value of the current context may be updated to an index corresponding to transIdxMPS. For example, when the value of pStateIdx is 16 and the MPS is encoded, pStateIdx may be updated to the index 17 corresponding to transIdxMPS. In contrast, when the value of pStateIdx is 16 and the LPS is encoded, indexes may be determined as the initial probability index. Here, information for selecting one of the multiple probability indexes may be signaled through the slice header, etc. For example, the device for decoding a video may select the probability index through information transmitted from the slice header, and may performing decoding using the selected probability index as the initial probability index.

As another example, multiple initial values (InitValue) may be assigned for one context so as to determine the initial probability index of the slice differently. When the initial value is selected, variables m and n may be derived using the initial value and a variable preCtxState indicating the previous context condition may be derived through the derived variable m and n. Based on the variable preCtxState indicating the previous context condition, the MPS and the context probability index initial value pStateIdx may be derived.

Table 7 shows a process of deriving the probability index based on the initial value.

TABLE 7 slopeIdx = initValue >> 4
offsetIdx = initValue & 15 (1)
m = slopeIdx * 5 − 45
n=(offsetIdx << 3)−16 (2)
preCtxState=Clip3(1,126,((m*Clip3(0,51,SliceQpY )) >> 4)+n)
valMps=(preCtxState <= 63)?0:1
pStateIdx = valMps ( preCtxState − 64 ) : ( 63 − preCtxState ) (3)

An index for specifying an initial value (InitValue) to be used in the slice may be signaled through the slice header. The index for specifying a context initial value may be defined as a CABAC initialization index (cabac_init_idx). Based on a table defining a mapping relation between at least two selected from a group of the CABAC initialization index, a context index (ctxIdx), and the initial value, an initial value corresponding to cabac_init_idx may be determined.

Also, a syntax indicating the number of available CABAC initialization indexes may be signaled through the slice header, the sequence header, the picture header, etc. The syntax indicating the number of available CABAC initialization indexes may be defined as 'num_cabac_init_idx_minus1'.

Table 8 and Table 9 are charts to explain an example of determining the initial value based on the CABAC initialization index. Table 8 shows the case where the number of available CABAC initialization indexes are five, and Table 9 shows the case where the number of available CABAC initialization indexes are six. Table 8 or Table 9 may be selectively used based on the value of num_cabac_init_minus1.

TABLE 8

| | | | | cabac_init_idx | | | | | |
|---|---|---|---|---|---|---|---|---|---|
| | 0 | | 1 | | 2 | | 3 | | 4 |
| | | | | ctxIdx | | | | | |
| | 0 | 1 | 0 | 1 | 0 | 1 | 0 | 1 | 0 | 1 |
| initValue | 111 | 141 | 153 | 111 | 153 | 111 | 168 | 224 | 95 | 79 |

TABLE 9

| | | | | | cabac_init_idx | | | | | | |
|---|---|---|---|---|---|---|---|---|---|---|---|
| | 0 | | 1 | | 2 | | 3 | | 4 | | 5 |
| | | | | | ctxIdx | | | | | | |
| | 0 | 1 | 0 | 1 | 0 | 1 | 0 | 1 | 0 | 1 | 0 | 1 |
| initValue | 111 | 141 | 153 | 111 | 153 | 111 | 168 | 224 | 95 | 79 | 63 | 31 |

Explaining a syntax 'cbf_luma' as an example, contexts of the syntax cbf_luma indicating whether a non-zero transform coefficient exists in the transform block of the luma component may have different initial values depending on cabac_init_idx. The probability index (pStateIdx) derived based on the initial value may also be determined differently depending on cabac_init_idx.

cabac_init_idx may indicate the offset to be applied to the probability index. For example, the probability index (pStateIdx) may be derived based on a quantization parameter (Qp) 'sliceQpY' of an arbitrary slice and an initial value (InitValue) determined for each context, and the offset to be applied to the probability index may be determined based on the value of cabac_init_idx. When the offset is determined, the probability index may be recalculated based on the probability index and the offset. Accordingly, even when the quantization parameters (Qp) of the slice are the same, the context model may have multiple probability indexes (i.e., multiple pStateIdx initial values).

As another example, the initial value may be determined for each context, and the offset to be applied to the initial value may be determined based on the value of cabac_init_idx. The initial value is recalculated based on the determined offset, and the probability index may be derived based on the recalculated initial value.

In a particular symbol rather than entire symbols, multiple probability indexes exist for one context. For example, in a particular symbol, such as the transform coefficient, a residual motion vector (a motion vector difference), a reference picture index (a reference index), etc., multiple probability indexes may exist for one context.

Whether multiple initial values (InitValue) or multiple probability indexes (pStateIdx) are applied to one context may be determined based on the slice type or regardless of the slice type. Also, the initial value may differ for each slice type.

FIG. 25 is a view illustrating an example of setting a probability index depending on a position of a block to be encoded.

The probability index may be determined depending on the spatial position or the scan order of the block to be encoded. For example, as shown in the example in FIG. 25, different probability indexes (pStateIdx) may be set depending on the scan order in the slice. Here, the value of the probability index (pStateIdx) may be selected to be the same or similar to the value of the probability index (prevPstateIdx) of the collocated region in the previous slice.

A spatial region for initializing the probability index may be referred to as 'a context initialization region'. The context initialization region may be provided in a rectangular shape, but is not limited thereto. Also, the context initialization region may be set to have a preset size, but is not limited thereto. Information for specifying context initialization region may be signaled through the slice header, etc.

Assuming that the context initialization region is in a rectangular shape, the unit by which the probability index is initialized may be determined based on a syntax 'num_row_ctu_minus1' indicating the number of rows of coding tree units included in the context initialization region. For example, when the value of 'num_row_ctu_minus1' is one, the region including the CTUs of two columns may be set as an initialization region as shown in the example in FIG. 25.

The slice is a default unit that can perform entropy encoding/decoding independently. The slice is not necessarily provided in a rectangular shape. The slice may be partitioned into multiple slice segments, and the slice segment may be composed of multiple coding tree units (CTU).

The tile is the same as the slice in that it is composed of multiple coding tree units like slice, but differs in that the tile is provided in a rectangular shape. Entropy encoding/decoding may be performed in tile units. When performing entropy encoding/decoding in tile units, there is an advantage that parallelization in which multiple tiles is simultaneously encoded/decoded can be performed.

FIGS. 26 and 27 are views illustrating examples of partitioning of tiles and slice segments.

As shown in the examples in FIGS. 26 and 27, the tile may include at least one slice segment, and one slice segment may exist in one tile.

An independent slice segment and at least one dependent slice segments compose one slice. As shown in the examples in FIGS. 26 and 27, the independent slice segment is not necessarily included in the tile.

Not shown in the drawings, multiple tiles may exist in the slice, or one tile may exist in one slice.

FIG. 28 is a view illustrating an example of determining an initial probability index for each tile differently.

When using tiles, the context model is initialized in tile units. Different initial values (InitValue) or different probability indexes (pStateIdx) may be used depending on the position of the tile. That is, even though the contexts are the same, different probability indexes (pStateIdx) may be used depending on the tiles.

An index for specifying the initial value of each tile may be signaled through the slice segment header, etc. For example, when the initial value is specified through the syntax 'tile_cabac_init_idx' for specifying the initial value of the tile, the probability index may be derived based on the specified initial value.

The probability index for each context of each tile may be derived based on the initial value or the probability index corresponding to the context of the collocated tile of the previous frame. As another example, the probability index for each context of each tile may be derived based on an initial value selected from multiple initial values defined for respective contexts, or may be determined as a probability index selected from multiple probability indexes defined for respective contexts. When the multiple initial values or the multiple probability indexes are defined for respective contexts, an index for selecting the initial value or the probability index for each tile may be signaled.

In the example shown in FIG. 28, for a residual motion information (the motion vector difference)-related symbol, in the first tile (tile0), the initial probability index is determined as pStateIdx0, and in the second time (tile1), the initial probability index is determined as pStateIdx1.

INDUSTRIAL APPLICABILITY

The present invention may be used in encoding/decoding a video signal.

The invention claimed is:
1. A method for decoding a video, the method comprising:
generating a first prediction sample by performing intra prediction on a current block;
determining an intra prediction pattern of a current block to which intra prediction is applied, the intra prediction pattern being used to determine a partition type of the current block;
partitioning the current block into a plurality of sub-blocks based on the determined intra prediction pattern;
generating a first prediction sample for a sub-block by performing intra prediction;
determining an offset for the sub-block to obtain a second prediction sample; and
generating the second prediction sample for the sub-block by using the first prediction sample and the offset, wherein:
when information specifying the intra prediction pattern of the current block is signaled via a bitstream, the intra prediction pattern of the current block is determined based on the information, and
when the information specifying the intra prediction pattern of the current block is not signaled via the bitstream, the intra prediction pattern of the current block is determined based on a size or a shape of the current block.

2. The method of claim 1, wherein the intra prediction pattern is used to determine whether the current block is partitioned vertically or horizontally.

3. The method of claim 1, wherein whether the offset is used to generate the second prediction sample is determined based on information signaled for the sub-block.

4. The method of claim 1, wherein a number of sub-blocks included in the current block is determined as one of 2 and 4.

5. The method of claim 1, wherein the offset is derived based on neighboring samples adjacent to the sub-block.

6. A device for decoding a video, the device comprising:
a prediction module circuitry configured to determine a intra prediction pattern which is used to determine a partition type of a current block, partition the current block into the plurality of sub-blocks based on the determined intra prediction pattern, generate a first prediction sample for a sub-block by performing intra prediction, determine an offset for the sub-block to obtain a second prediction sample, and generate the second prediction sample for the sub-block by using the first prediction sample and the offset,
wherein:
when information specifying the intra prediction pattern of the current block is signaled via a bitstream, the intra prediction pattern of the current block is determined based on the information, and
when the information specifying the intra prediction pattern of the current block is not signaled via the bitstream, the intra prediction pattern of the current block is determined based on a size or a shape of the current block.

7. The device of claim 6, wherein the intra prediction pattern is used to determine whether the current block is partitioned vertically or horizontally.

8. The device of claim 6, wherein whether the offset is used to generate the second prediction sample is determined based on information signaled for the sub-block.

9. The device of claim 6, wherein a number of sub-blocks included in the current block is determined as one of 2 and 4.

10. The device of claim 6, wherein the prediction module derives the offset based on neighboring samples adjacent to the sub-block.

11. A method for encoding a video, the method comprising:
- generating a first prediction sample by performing intra prediction on a current block;
- determining an intra prediction pattern of a current block to which intra prediction is applied, the intra prediction pattern being used to determine a partition type of the current block;
- partitioning the current block into a plurality of sub-blocks based on the determined intra prediction pattern;
- generating a first prediction sample for a sub-block by performing intra prediction;
- determining an offset for the sub-block to obtain a second prediction sample; and
- generating the second prediction sample for the sub-block by using the first prediction sample and the offset, wherein:
- when the intra prediction pattern is determined adaptively based on a size or a shape of the current block, information specifying the intra prediction pattern of the current block is not encoded in a bitstream, and
- when the intra prediction pattern is not determined based on the size or the shape of the current block, the information to determine the intra prediction pattern of the current block is encoded in the bitstream.

12. The method of claim 11, wherein the intra prediction pattern is used to determine whether the current block is partitioned vertically or horizontally.

13. The method of claim 11, wherein the method further comprises encoding information indicating whether the offset is used to generate the second prediction sample.

14. The method of claim 11, wherein a number of sub-blocks included in the current block is determined as one of 2 and 4.

15. A device for encoding a video, the device comprising:
- a prediction module circuitry determine an intra prediction pattern which is used to determine a partition type of a current block, partition the current block into plurality of sub-blocks based on the determined intra prediction pattern, generate a first prediction sample by performing intra prediction for a sub-block, determine an offset for the sub-block to obtain a second prediction sample, and generate the second prediction sample for the sub-block by using the first prediction sample and the offset, wherein:
- when the intra prediction pattern is determined adaptively based on a size or a shape of the current block, information specifying the intra prediction pattern of the current block is not encoded in a bitstream, and
- when the intra prediction pattern is not determined based on the size or the shape of the current block, the information to determine the intra prediction pattern of the current block is encoded in the bitstream.

\* \* \* \* \*